US010853144B2

(12) United States Patent
Nanda et al.

(10) Patent No.: US 10,853,144 B2
(45) Date of Patent: Dec. 1, 2020

(54) RULES BASED DECOMPOSITION OF TASKS FOR RESOURCE ALLOCATION

(71) Applicant: Microsoft Technology Licensing, LLC, Redmond, WA (US)

(72) Inventors: Rekha Nanda, Redmond, WA (US); Michael V. Ehrenberg, Seattle, WA (US); Yanfang Shen, Bellevue, WA (US); Malvika Malge, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 236 days.

(21) Appl. No.: 15/917,422

(22) Filed: Mar. 9, 2018

(65) Prior Publication Data

US 2018/0260253 A1    Sep. 13, 2018

Related U.S. Application Data

(60) Provisional application No. 62/469,501, filed on Mar. 9, 2017.

(51) Int. Cl.
*G06F 9/50* (2006.01)
*G06F 9/48* (2006.01)
(Continued)

(52) U.S. Cl.
CPC .......... *G06F 9/5038* (2013.01); *G06F 9/4806* (2013.01); *G06F 11/3476* (2013.01); *G06Q 10/083* (2013.01); *G06Q 30/0635* (2013.01)

(58) Field of Classification Search
CPC .............................. G06Q 40/00; G06Q 40/06
(Continued)

(56) References Cited

U.S. PATENT DOCUMENTS

| 5,450,317 A | 9/1995 | Lu et al. |
| 5,838,968 A | * 11/1998 | Culbert ................. G06F 9/5011 |
| | | 718/104 |

(Continued)

FOREIGN PATENT DOCUMENTS

| WO | 0177783 A2 | 10/2001 |
| WO | 2015116038 A1 | 8/2015 |

OTHER PUBLICATIONS

Bin et al (Research on the Reconfigurable Network System Based on the Task Decomposition), Research Article, Jun. 2013, pp. 1-9 (Year: 2013).*

(Continued)

*Primary Examiner* — Romain Jeanty
(74) *Attorney, Agent, or Firm* — Mannava & Kang, P.C.

(57) ABSTRACT

According to examples, an apparatus may include a processor and a memory on which are stored machine readable instructions that when executed by the processor, cause the processor to identify a plurality of tasks, identify a plurality of resources configured to execute the tasks, and decompose the plurality of tasks into multiple groups of tasks based on a plurality of rules applicable to the multiple groups of tasks. The instructions may also cause the processor to, for each group in the multiple groups of tasks, model the group of tasks and a subset of the plurality of resources as a respective resource allocation problem and assign a respective node of a plurality of nodes to solve the resource allocation problem.

14 Claims, 10 Drawing Sheets

(51) Int. Cl.
*G06F 11/34* (2006.01)
*G06Q 10/08* (2012.01)
*G06Q 30/06* (2012.01)

(58) Field of Classification Search
USPC .................................................. 705/7.12
See application file for complete search history.

(56) References Cited

U.S. PATENT DOCUMENTS

| | | | |
|---|---|---|---|
| 7,177,825 | B1 | 2/2007 | Borders et al. |
| 7,257,552 | B1 | 8/2007 | Franco |
| 7,584,160 | B2 | 9/2009 | Friedlander et al. |
| 8,015,081 | B1 | 9/2011 | Franco |
| 8,131,604 | B2 | 3/2012 | Christ et al. |
| 8,392,262 | B2 | 3/2013 | Mallick et al. |
| 8,799,178 | B2 | 8/2014 | LaVoie et al. |
| 10,289,453 | B1* | 5/2019 | Wei ............... H04L 43/0876 |
| 2002/0072956 | A1 | 6/2002 | Willems et al. |
| 2002/0163882 | A1 | 11/2002 | Bornstein et al. |
| 2003/0172007 | A1 | 9/2003 | Helmolt et al. |
| 2003/0177072 | A1 | 9/2003 | Bared |
| 2007/0021998 | A1* | 1/2007 | Laithwaite ....... G06Q 10/06311 705/7.13 |
| 2007/0220525 | A1 | 9/2007 | State et al. |
| 2011/0231215 | A1* | 9/2011 | Santos ............... G06F 17/11 705/7.12 |
| 2014/0122143 | A1* | 5/2014 | Fletcher ............ G06Q 10/0631 705/7.14 |
| 2015/0120599 | A1 | 4/2015 | Deshpande et al. |
| 2015/0160979 | A1* | 6/2015 | Moffitt ............ G06F 9/5066 718/104 |
| 2015/0286997 | A1 | 10/2015 | Zimmerman et al. |
| 2017/0344944 | A1 | 5/2017 | Yao et al. |
| 2018/0211201 | A1 | 7/2018 | Nayak et al. |

OTHER PUBLICATIONS

"Guest Post: To Boldly Manage Inventory in an Omnichannel World", Retrieved from <<https://sourcingjournalonline.com/guest-post-to-boldly-manage-inventory-in-an-omnichannel-world/>>, Sep. 11, 2015, 7 Pages.

"Henry's Expands Omni-Channel Commerce Strategy with OrderDynamics", Retrieved from <<https://www.orderdynamics.com/blog/press-release/detail/henrys-expands-omni-channel-commerce-strategy-reserve-online-pickup-store-functionality-orderdynamics/>>, Jul. 25, 2013, 3 Pages.

"Sterling Distributed Order Management", Retrieved from <<https://www.ibm.com/support/knowledgecenter/en/SS6PEW_9.3.0/com.ibm.help.om.prodover.doc/c_OverviewDistributedOrderManagement.html.>>, Retrieved Date: May 25, 2017, 1 page.

Coronado, Victor, "E-Commerce: Order Fulfillment in an Omni-Channel World", Retrieved from <<https://www.linkedin.com/pulse/e-commerce-order-fulfillment-omni-channel-world-victor-coronado>>, Dec. 28, 2015, 7 Pages.

Haber, John, "Amazon is Redefining the Supply Chain", Retrieved from <<http://parcelindustry.com/article-4552-Amazon-Is-Redefining-the-Supply-Chain.html>>, Feb. 5, 2016, 5 Pages.

Hong, et al., "Resource Allocation Optimization in Large Scale Distributed Systems Public Deposited", Retrieved from <<https://ir.library.oregonstate.edu/concern/graduate_thesis_or_dissertations/ff365874s>>, May 16, 2014, 5 Pages.

Meller, Russ, "Order Fulfillment as a Competitive Advantage", Retrieved from <<https://www.supplychain247.com/article/order_fulfillment_as_a_competitive_advantage>>, Mar. 5, 2015, 15 Pages.

Morton, et al., "Warehouse/DC Management: Inventory Management Requires an End-to-End Approach", Retrieved from <<https://www.logisticsmgmt.com/article/warehouse_dc_management_inventory_management_requires_an_end_to_end_approac>>, Mar. 1, 2015, 3 Pages.

Mundoor, Nipun, "Omni-Channel and Supply Chain Strategy-Accenture", Published in Accenture Analytics, Sep. 25, 2015, 4 Pages.

Santos, et al., "A Mathematical Optimization Approach for Resource Allocation in Large Scale Data Centers", In HP Labs Technical Report, HPL-2002-64 (R.1), Dec. 12, 2002, 25 Pages.

Thomas, Kelly, "10 Steps on the Path to Profitable Omnichannel Growth", Retrieved from <<http://www.supplychainquarterly.com/topics/Technology/20151216-10-steps-on-the-path-to-profitable-omnichannel-growth/>>, Retrieved Date: May 25, 2017, 8 Pages.

Wee, et al., "Inventory Allocation for an Omnichannel Strategy", Retrieved from <<https://repository.tudelft.nl/islandora/object/uuid:ae42f536-126e-4658-bba7-4fb7282d7337/datastream/OBJ>>, 2015, 218 Pages.

Xu, Ping Josephine., "Order Fulfillment in Online Retailing: What Goes Where", In Doctoral Dissertation Submitted to the Sloan School of Management in Partial Fulfillment of the Requirements for the Degree of Doctor of Philosophy in Operations Research, Massachusetts Institute of Technology, Sep. 2005, 146 Pages.

Xu, et al., "Resource Allocation Optimization Model of Collaborative Logistics Network Based on Bilevel Programming", In Journal Scientific Programming, vol. 2017, Feb. 22, 2017, 10 Pages.

Yu, Jia Yuan., "Linear Optimization", Retrieved from <<http://users.encs.concordia.ca/~jiayuan/scd15/I5.pdf>>, Nov. 10, 2015, 5 Pages.

"Non Final Office Action Issued in U.S. Appl. No. 15/640,267", dated Nov. 18, 2019, 19 Pages.

"Final Office Action Issued in U.S. Appl. No. 15/640,267", dated Apr. 22, 2020, 23 Pages.

* cited by examiner

RULES BASED DECOMPOSITION OF TASKS FOR RESOURCE ALLOCATION

CLAIM FOR PRIORITY

The present application claims the benefit of priority to U.S. Provisional Application Ser. No. 62/469,501 having the title "DECOMPOSITION OF COMPUTATIONAL PROCESSING FOR NETWORK ROUTING AND OTHER COMPUTATIONAL TASKS," filed on Mar. 9, 2017, the disclosure of which is hereby incorporated by reference in its entirety.

BACKGROUND

Computer systems are widely used for many applications in today's digital environment. In many instances, computer applications perform computationally intensive tasks to derive usable results for real-world, practical applications. This may include situations that require analysis of extensive amounts of data, or situations where the computer application performs computations on an extensive number of variables, e.g., hundreds or thousands of variables, taking into consideration multiple rules and constraints, to derive usable results for a real-world, practical application. Placement of workloads on compute nodes in a network is one such example of a real-world, practical application whereby multiple rules and constraints are to be considered to determine placements of the workloads that satisfy various goals while complying with the multiple rules and constraints.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
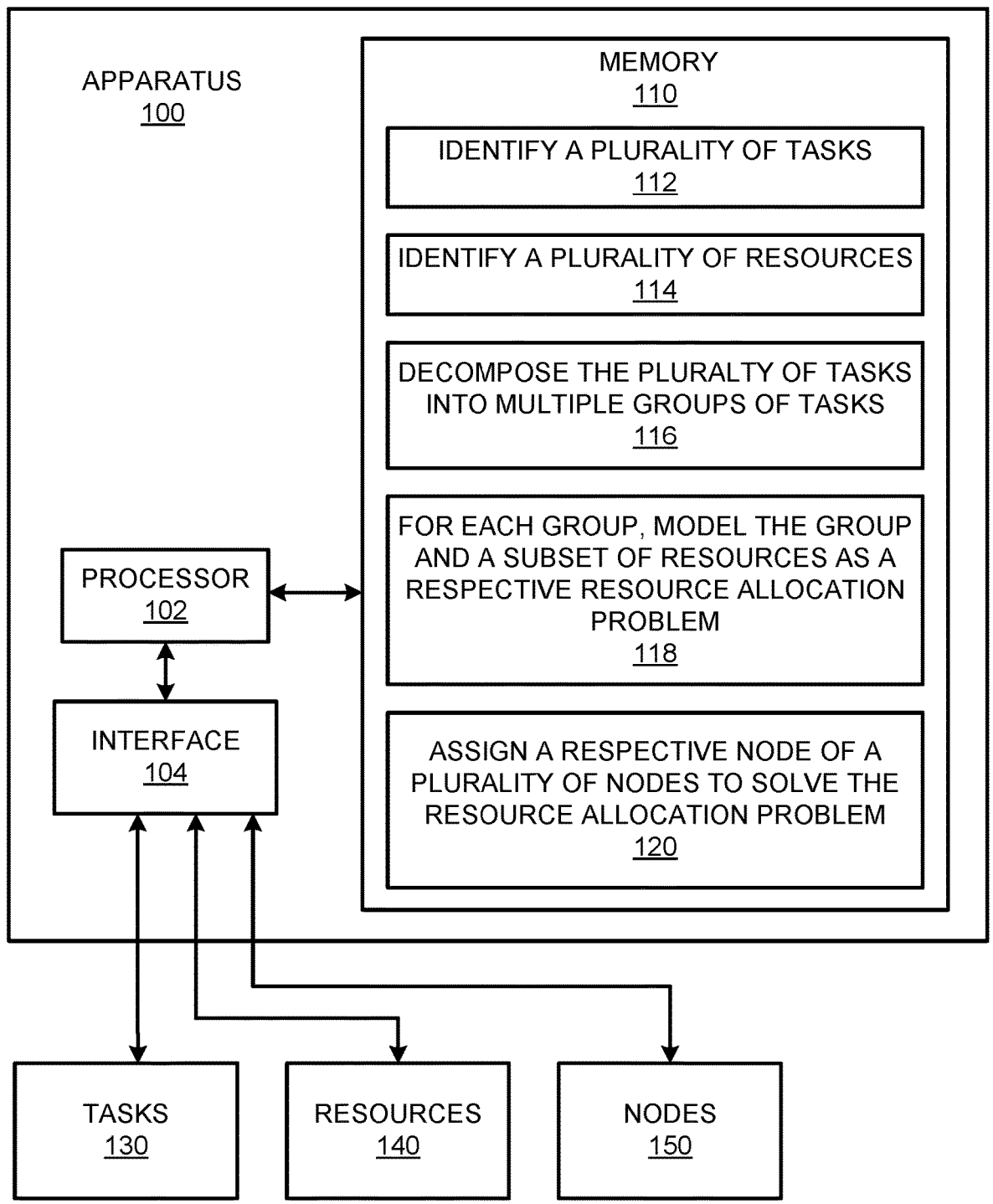
FIG. 1 depicts a block diagram of an apparatus that may assign respective nodes to solve resource allocation problems for multiple groups of tasks in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

A resource allocation problem may be used to model tasks and resources to execute the tasks for which rules and constraints apply. As the number of tasks, resources, rules, and constraints increase, finding a solution to the resource allocation problem becomes increasingly computationally intensive. As a result, a technical problem may be that a computing device having ever increasing computational resources that consume ever increasing amounts of processing resources and power may be required to solve the resource allocation problems within a certain amount of time, which may not be technically possible. That is, for example, in some instances in which there are a large number, e.g., hundreds, thousands, or tens of thousands, of tasks, resources, constraints, and rules, the amount of time required to solve the resource allocation problem may become so high that the solution may not be determined before the resources are to be allocated to execute the tasks. Thus, for instance, solving the resource allocation problem may delay the allocation of resources and thus, may delay execution of the tasks.

Disclosed herein are apparatuses and methods for generating a fulfillment plan for the execution of a plurality of tasks, e.g., at least two tasks, by splitting a resource allocation problem corresponding to the fulfillment plan into multiple smaller resource allocation problems, e.g., two or more smaller resource allocation problems, and assigning different nodes, e.g., two or more nodes, to solve the smaller resource allocation problems. As the smaller resource allocation problems may include fewer tasks, constraints, rules, etc., than the resource allocation problem, the nodes may utilize less processing resources and power in solving the smaller resource allocation problems as compared with a node solving the resource allocation problem. Additionally, the nodes may solve the smaller resource allocation problems in less time. Thus, for instance, the apparatuses disclosed herein may generate the fulfillment plan such that the generation of the fulfillment plan may not be a bottleneck to the execution of the tasks. In addition, as the apparatuses disclosed herein may generate fulfillment plans in a shorter period of time, the apparatuses may respond to more changes to tasks within the same time period.

The apparatuses and methods disclosed herein may decompose a plurality of tasks into multiple groups of tasks, e.g., at least two groups of tasks, based on rules that are applicable to the tasks. That is, a first group may include at least one task for which a first rule applies and a second group may include at least one task for which a second rule applies. In addition, resources that may execute the tasks in the groups may be identified such that respective subsets of resources that may execute the groups of tasks may be identified. Moreover, each of the groups of tasks and the respective subsets of resources may be modeled as a separate resource allocation problem. In this regard, instead of considering all of the tasks and the resources together as a single resource allocation problem, the groups of tasks and the respective subsets of resources may be modeled as smaller resource allocation problems. In addition, the smaller resource allocation problems may be assigned to multiple nodes such that nodes may solve the resource allocation problems in parallel. Accordingly, through implementation of the apparatuses and methods disclosed herein, a technical advancement in operating nodes to develop a fulfillment plan for the execution of a plurality of tasks within a certain time limit may be realized, e.g., prior to a time when execution of the tasks is to be initiated.

Also disclosed herein are apparatuses and methods to identify a fulfillment plan regarding delivery of items in multiple orders to their intended destinations in a manner that maximizes compliance with factors pertaining to the delivery of the items. Generally speaking, the identified fulfillment plan may be the best plan from among a plurality of candidate fulfillment plans, e.g., at least two candidate fulfillment plans. That is, the identified fulfillment plan may be the plan under which the items may be delivered in a manner that results in minimized costs, minimized delivery times, minimized violations of rules, and/or a combination of minimized costs, minimized delivery times, and/or minimized violations of rules among the candidate fulfillment plans. In addition or in other examples, the identified fulfillment plan may be defined as a fulfillment plan that results in the items being delivered in a substantially optimized manner as may be determined within a certain amount of time and/or a certain number of iterations.

The apparatuses disclosed herein may generate a rule-based model of a distributed order fulfillment problem and may solve that problem to identify the fulfillment plan. That is, the apparatuses disclosed herein may model the order fulfillment problem as a network of potential providers, potential intermediaries, and a group of unfilled orders. In addition, the apparatuses may implement a heuristic method to solve the order fulfillment problem in a manner that may result in compliance with at least one factor pertaining to the delivery of the items in the orders being maximized among the possible fulfillment plans. Particularly, the apparatuses disclosed herein may generate a plurality of candidate fulfillment plans using respective random decision variables, may calculate evaluation values for the candidate fulfillment plans, and may select the best fulfillment plan based upon the calculated evaluation values.

Items, such as goods, packets of data, etc., may often be provided by at least one of a plurality of providers and may traverse at least one of a plurality of intermediaries prior to reaching a final destination. As such, the items may take any of a plurality of paths from the providers to the destinations through the intermediaries. The multiple paths may be associated with different monetary costs, different delivery times, rules, and the like, with respect to each other. In this regard, delivering the items via one of the paths instead of another one of the paths may result in higher costs, longer delivery times, and/or violations of rules. Selection of a path that is associated with higher costs, longer delivery times, and/or that violates a rule may thus result in inefficient delivery of the items. That is, for instance, selection of a particular path may result in the items being provided by a particular provider and/or traversing a particular intermediary that the items would not have traversed had the path that results in minimized costs, minimized delivery times, and/or minimized violations of rules been utilized instead of the selected particular path. Improper selection of a particular path may thus result in an inefficient use of the providers and/or the intermediaries.

The apparatuses and methods disclosed herein may determine a plurality of candidate fulfillment plans, may compare the candidate fulfillment plans with respect to each other, and may select one of the candidate fulfillment plans as the fulfillment plan for delivering the items over the network. Particularly, for instance, an evaluation value (or equivalently, an evaluation score) for each of the candidate fulfillment plans may be calculated and may be compared with respect to each other to identify the candidate fulfillment plan corresponding to a highest level of compliance with a plurality of factors in the delivery of the items. In addition, information pertaining to the identified candidate fulfillment plan may be outputted such that the items may be delivered according to the identified candidate fulfillment plan. By identifying the candidate fulfillment plan having the highest level of compliance with the plurality of factors in the delivery of the items and instructing compliance with the identified candidate fulfillment plan, the items may be delivered with fewer violations of sets of rules and constraints. In this regard, the providers and/or the intermediaries may be utilized in a compliant manner in the delivery of the items.

Additionally, a distributed order management problem may be a NP-hard problem that may require a great deal of computational resources and time. The apparatuses and methods disclosed herein may decompose the distributed order management problem into subtasks and may solve the subtasks individually, which may increase the computational efficiency of the apparatuses as compared with apparatuses that do not decompose the distributed order management problem. This may result in a reduction in processing time and usage of computational resources in determining the fulfillment plan for the delivery of items.

FIG. 1 depicts a block diagram of an apparatus 100 that may assign respective nodes to solve resource allocation problems for multiple groups of tasks in accordance with an embodiment of the present disclosure. It should be understood that the apparatus 100 depicted in FIG. 1 may include additional features and that some of the features described herein may be removed and/or modified without departing from the scope of the apparatus 100.

The apparatus 100 may be a client machine, such as a personal computer, a laptop computer, a tablet computer, or the like. The apparatus 100 may alternatively be a server machine, such as a computing device that functions as a server. In any regard, the apparatus 100 may include a processor 102, which may be a semiconductor-based microprocessor, a central processing unit (CPU), an application specific integrated circuit (ASIC), a field-programmable gate array (FPGA), and/or other hardware device. Although the apparatus 100 is depicted as having a single processor

102, it should be understood that the apparatus 100 may include additional processors without departing from a scope of the apparatus 100.

The apparatus 100 may also include a memory 110, which may be, for example, Random Access memory (RAM), an Electrically Erasable Programmable Read-Only Memory (EEPROM), a storage device, an optical disc, or the like. The memory 110, which may also be referred to as a computer readable storage medium, may be a non-transitory machine-readable storage medium, where the term "non-transitory" does not encompass transitory propagating signals. In any regard, the memory 110 may have stored thereon machine readable instructions 112-120.

The apparatus 100 may further include an interface 104, which may include hardware, software, or a combination thereof that is to facilitate the communication of information to and/or from the processor 102. For instance, the processor 102 may access, via the interface, a plurality of tasks 130, e.g., at least two tasks 130, and a plurality of resources 140, e.g., at least two resources 140, that are configured to execute the tasks 130. The information pertaining to the tasks 130 and the resources 140 may be stored in a data store (or on multiple data stores) (not shown) that is external to the apparatus 100. In these examples, the processor 102 may access the information to the tasks 130 and the resources 140 via a network, such as an Intranet, the Internet, or the like. In other examples, however, the data store(s) on which the information pertaining to the tasks 130 and the resources 140 are stored may be part of the apparatus 100.

The processor 102 may also communicate with a plurality of nodes 150, e.g., at least two nodes, via the interface 104. The nodes 150 may include servers, processors, CPUs, or other processing devices that the processor 102 may assign and/or direct to solve resource allocation problems as discussed herein. The nodes 150 may operate independently from each other and may thus solve the resource allocation problems in parallel with each other. The nodes 150 may be cloud-based processing devices and the processor 102 may communicate with the nodes 150 via the Internet.

The processor 102 may fetch, decode, and execute the instructions 112 to identify a plurality of tasks 130. The processor 102 may identify the plurality of tasks 130 by accessing identifications of the tasks 130 via the interface 104. The processor 102 may identify information pertaining to the tasks 130, such as details of the tasks 130, statuses of the tasks 130, rules applicable to the tasks 130, and/or the like. According to examples, the tasks 130 may include placements of computing jobs, which may also be called computing workloads, on a plurality of processing devices, e.g., cloud-based processing devices. In other examples, the tasks 130 may include delivery of items, which may also be called products, packages, and/or the like.

The processor 102 may fetch, decode, and execute the instructions 114 to identify a plurality of resources 140 configured to execute the tasks 130. The processor 102 may identify the plurality of resources 140 by accessing information pertaining to the resources 140 via the interface 104. The information pertaining to the resources 140 may include details of the resources 140, statuses of the resources 140, rules applicable to the resources 140, and/or the like. According to examples, the resources 140 may include processing devices, e.g., CPU cores, storage servers, service instance endpoints, or the like, that may execute or host computing workloads. In other examples, the resources 140 may include stores, warehouses, products, inventory levels of warehouses, distribution centers, transportation services, or the like, that may form part of a distribution infrastructure for delivery of items.

The processor 102 may fetch, decode, and execute the instructions 116 to decompose the plurality of tasks 130 into multiple groups of tasks, e.g., at least two groups, based on a plurality of rules applicable to the multiple groups of tasks. For instance, the processor 102 may decompose the plurality of tasks 130 according to the rule or rules that are applicable to the tasks 130. In this regard, the processor 102 may group a first subset of the plurality of tasks 130, e.g., at least one task 130, into a first group, in which a first rule applies to the task(s) in the first group, may group a second subset of the plurality of tasks 130, e.g., at least one task 130, into a second group, in which a second rule applies to the task(s) in the second group, and so forth. According to examples, the rules may be directed to completion deadlines, priorities, etc.

The processor 102 may fetch, decode, and execute the instructions 118 to, for each group in the multiple groups of tasks 130, model the group of tasks 130 and a subset of the plurality of resources 140 as a respective resource allocation problem. That is, the processor 102 may determine a first resource allocation problem for a first group of tasks 130 and a first subset of the resources 140 configured to execute the tasks 130 in the first group. The first subset of the resources 140 may include the resources 140 that are capable of carrying out the tasks in the first group, the resources 140 that comply with rules applicable to the tasks in the first group, etc. The processor 102 may also determine a second resource allocation problem for a second group of tasks 130 and a second subset of the resources 140 configured to execute the tasks in the second group. The second subset of the resources 140 may include the resources 140 that are capable of carrying out the tasks in the second group, the resources 140 that comply with rules applicable to the tasks in the second group, etc.

The first resource allocation problem may be modeled as a problem, e.g., in the form of an equation, an algorithm, or the like, in which rules, constraints, goals, etc., pertaining to the first group of tasks 130 may be variables, factors, or the like. In addition, the first resource allocation problem may be modeled such that a solution to the first resource allocation problem may identify for instance, various elements and/or components that may be implemented in order to complete the first group of tasks 130 while satisfying the rules and constraints and while meeting the goals, etc., pertaining to the first group of tasks 130. In other words, the solution to the first resource allocation problem may be a resource allocation plan for the tasks in the first group of tasks 130 that may meet a predefined goal or objective.

The second resource allocation problem may be modeled as a problem in which rules, constraints, goals, etc., pertaining to the second group of tasks 130 may be variables, factors, or the like. In addition, the second resource allocation problem may be modeled such that a solution to the second resource allocation problem may identify for instance, various elements and/or components that may be implemented in order to complete the second group of tasks 130 while satisfying the rules and constraints and while meeting the goals, etc., pertaining to the second group of tasks 130. In other words, the solution to the second resource allocation problem may be a resource allocation plan for the tasks in the second group of tasks 130 that may meet a predefined goal or objective. The processor 102 may model additional resource allocation problems for additional groups of tasks 130.

The processor 102 may model the groups of tasks as respective resource allocation problems, in which the respective resource allocation problems are any suitable types of resource allocation problems. In addition, the resource allocation problems may be modeled such that the resource allocation problems may be solved using any of a number of solvers. By way of particular example, the resource allocation problem may be modeled as a linear problem although other types of modeling techniques may be implemented. For instance, the processor 102 may generate the models as a linear integer problem, e.g., a distributed order management problem, which may be solved through application of a linear programming method.

By decomposing the tasks 130 into multiple groups, the processor 102 may decompose, e.g., split, a resource allocation problem for completing the tasks 130 into smaller resource allocation problems. In instances in which there are, for instance, hundreds or thousands of tasks 130 and/or resources 140, the number of factors to be considered may make it difficult or impossible for a single resource allocation problem to be solved in a timely manner, e.g., in time to prevent a delay in the execution of the tasks. In contrast, the smaller resource allocation problems may have a fewer number of factors to be considered and thus, may be solved more readily and with fewer processing resources.

The processor 102 may fetch, decode, and execute the instructions 120 to assign a respective node of a plurality of nodes 150 to solve a resource allocation problem. That is, the processor 102 may assign a first resource allocation problem to a first node of the plurality of nodes 150, a second resource allocation problem to a second node of the plurality of nodes 150, and so forth. According to examples, the nodes 150 may be cloud-based processing devices and may be housed in one data center or across multiple data centers. In any regard, the nodes 150 may solve the resource allocation problems in parallel with each other such that solutions for the resource allocation problems may be determined in a timely manner, e.g., prior to a desired task execution initiation time. The solutions may be respective resource allocation plans that the processor 102 may combined into a fulfillment plan for completing the tasks 130.

Although a single apparatus 100 has been depicted in FIG. 1, it should be understood that multiple apparatuses having similar or different configurations with respect to the apparatus 100 may be implemented to perform the functions discussed above. Thus, for instance, the decomposition of tasks 130, the modeling of the groups of tasks and subsets of resources 140, and the allocation of the respective nodes 150 to respectively solve the resource allocation problems may be distributed across multiple apparatuses.

Figure 2:
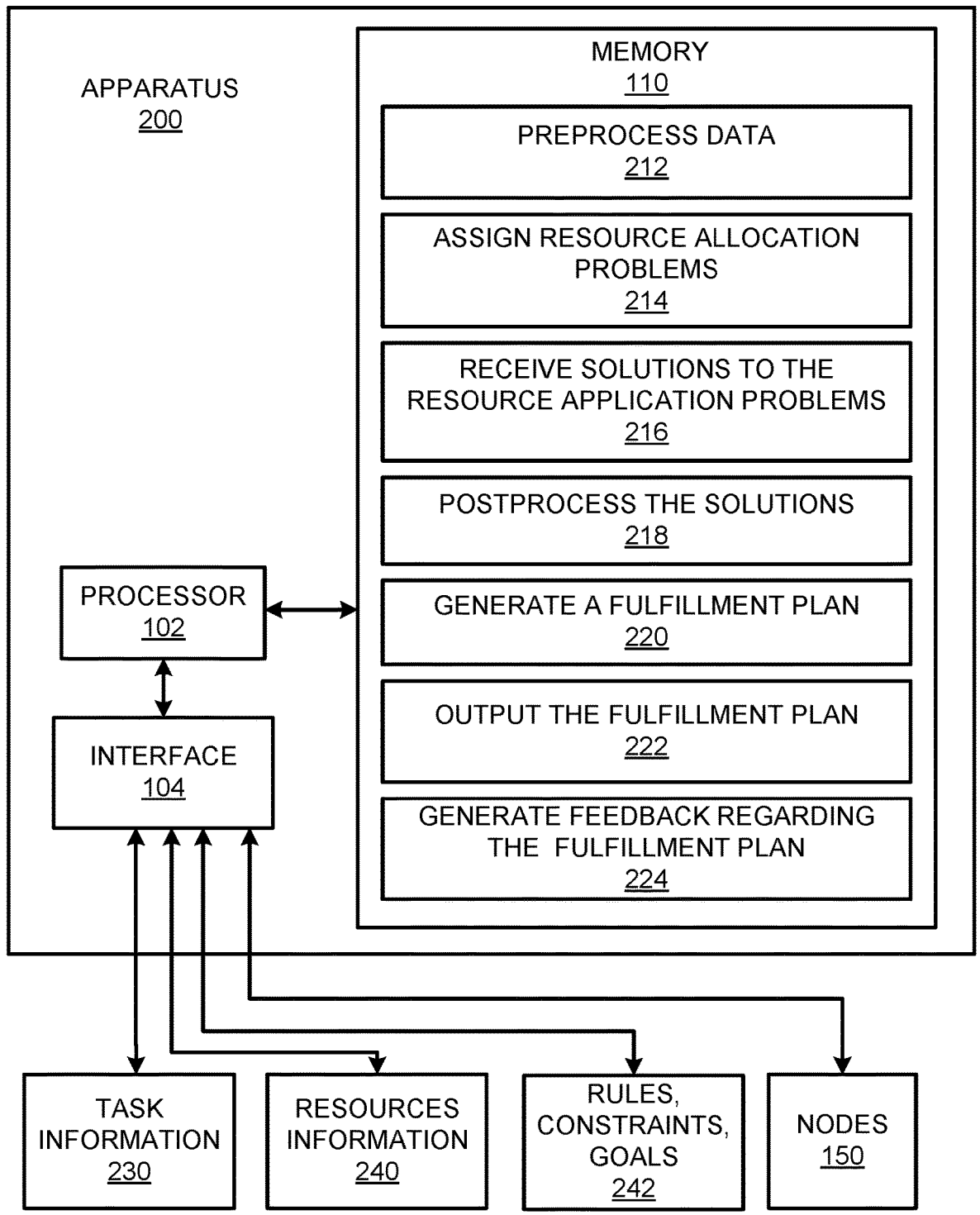
FIG. 2 depicts a block diagram of an apparatus that may manage pre-processing, processing, and post-processing operations in generating a fulfillment plan for a plurality of tasks in accordance with an embodiment of the present disclosure.

Reference is now made to FIG. 2, which depicts a block diagram of an apparatus 200 that may manage pre-processing, processing, and post-processing operations in generating a fulfillment plan for a plurality of tasks in accordance with an embodiment of the present disclosure. It should be understood that the apparatus 200 depicted in FIG. 2 may include additional features and that some of the features described herein may be removed and/or modified without departing from the scope of the apparatus 200.

The apparatus 200 may include the processor 102, the interface 104, and the memory 110 of the apparatus 100 depicted in FIG. 1, and may thus be equivalent to or the same as the apparatus 100. In one regard, the apparatus 200 may implement the same features and functions as the apparatus 100, but is presented to describe the features and the functions in a manner that differs from the apparatus 100. In addition, the memory 110 may have stored thereon machine readable instructions 212-224.

The processor 102 may access various information via the interface 104. For instance, the processor 102 may access, via the interface 104, information 230 pertaining to a plurality of tasks 130 that are to be executed, information 240 pertaining to resources 140 that may implement or execute the tasks 130, information 242 pertaining to rules and constraints applicable to the tasks 130, the resources 140, and the nodes 150, and goals applicable to completion of the tasks 130. The information 230, 240, 242, pertaining to the tasks 130, the resources 140, and the rules, constraints, and goals may be stored in a data store (or on multiple data stores) (not shown) that is external to the apparatus 200. In these examples, the processor 102 may access the information 230, 240, 242 via a network, such as an Intranet, the Internet, or the like. In other examples, however, the data store(s) on which the information 230, 240, 242 is stored may be part of the apparatus 200. The processor 102 may also communicate with a plurality of nodes 150 via the interface 104 as discussed above.

The processor 102 may fetch, decode, and execute the instructions 212 to preprocess data. For instance, the processor 102 may preprocess data by identifying information 230 pertaining to a plurality of tasks 130 that are to be executed as well as information 240 pertaining to a pool of resources 140 that may be used to execute or carry out the tasks 130. The information 230 pertaining to the tasks 130 may include, for instance, various rules applicable to the tasks 130, such as, the order in which the tasks 130 are to be processed, various restrictions on the tasks 130, etc. The information 240 pertaining to the pool of resources 140 may include, for instance, identifications of the resources 140 that have the ability to carry out the tasks 130, identifications of the resources 140 that meet criteria, e.g., are authorized, to carry out the tasks 130, etc. The processor 102 may identify from the information 230, 240, for instance, which subsets of the resources 140 are configured to execute which of the tasks 130.

The processor 102 may also preprocess the data by decomposing the tasks 130 into multiple groups of tasks based on a plurality of rules applicable to the multiple groups of tasks 130. That is, the processor 102 may identify the tasks 130 to which a first rule is applicable, the tasks 130 to which a second rule is applicable, etc. In addition, processor 102 may group the tasks 130 to which the first rule is applicable in a first group, the tasks 130 to which the second rule is applicable in a second group, etc. By way of particular example in which the tasks 130 pertain to fulfilling multiple sales orders, the first rule and the second rule may be different delivery rules, e.g., shipping priority rules (overnight, two-day, etc.). As another example in which the tasks 130 pertain to allocation of computing jobs for execution on multiple cloud resources, e.g., servers, the first rule and the second rule may be different job priorities (job request times, requester priorities, lengths of time in a queue, operation optimizations, completion deadlines, resource requirements, required locations of resource for compliance with regulatory requirements, etc. Examples in which the tasks 130 are items to be delivered or computing jobs are discussed in detail below with respect to FIG. 4.

The processor 102 may also preprocess the data by constructing a resource allocation problem, which may also be referenced as a resource allocation optimization problem, for each of the multiple groups of tasks 130. That is, for instance, the processor 102 may create or model a resource allocation problem for each of the multiple groups of tasks 130 that includes, as factors, the rules and constraints applicable to the tasks 130 and the resources 140 as well as a goal applicable to the tasks 130. The goal may include, for instance, minimize costs, maximize customer satisfaction levels, maximize compliance with rules, maximize efficiency, minimize time, minimize energy consumption, and/or the like. In some instances, some of the tasks 130 may have relationships with other tasks 130. For example, there may be a rule that states that some tasks 130 may not be initiated until other tasks 130 are completed. This type of rule may also be included as a factor in the resource allocation problem for a group of tasks 130.

The processor 102 may fetch, decode, and execute the instructions 214 to assign and/or direct a respective node of the plurality of nodes 150 to solve a resource allocation problem. That is, the processor 102 may assign a first node to solve a first resource allocation problem for a first group of tasks and a first subset resources, a second node to solve a second resource allocation problem for a second group of tasks and a second subset of resources, etc. The processor 102 may also direct the nodes 150 to solve the respective resource allocation problems, e.g., the processor 102 may send instructions to the nodes 150 to solve the respective resource allocation problems. The nodes 150 may employ any of a number of solvers to solve the respective resource allocation problems. For instance, the nodes 150 may employ solvers that are suited for solving the respective resource allocation problems. In this regard, the nodes 150 may employ solvers that are particularly suited for solving the particular type of resource allocation problem. The nodes 150 may also send the solutions to the resource allocation problems to the apparatus 200.

As noted herein, the processor 102 may decompose a resource allocation problem into smaller resource allocation problems. The processor 102 may also assign multiple nodes to solve the smaller resource allocation problems, for instance, in parallel and in a distributed manner.

The processor 102 may fetch, decode, and execute the instructions 216 to receive the solutions to the resource application problems from the nodes 150. The processor 102 may also fetch, decode, and execute the instructions 218 to postprocess the solutions. That is, the processor 102 may determine whether execution of a received solution will result in a rule applicable to a task 130 or a resource 140 being violated. Based on a determination that execution of a received solution will result in a rule being violated, the processor 102 may attempt to modify the solution, e.g., modify the allocation plan for a group of tasks 130, if possible. If not, the processor 102 may reject the received solution. In addition, the processor 102 may identify the resource allocation problem corresponding to the rejected solution and may assign a node to solve the identified resource allocation problem such that the solution of the identified resource allocation problem does not result in the rule being violated. For instance, the processor 102 may modify the resource allocation problem to include the violated rule as a factor such that the solution to the resource allocation problem does not result in the rule being violated and the processor 102 may assign the modified resource allocation problem to a node 140 for the node 140 to solve the modified resource allocation problem.

The processor 102 may fetch, decode, and execute the instructions 220 to generate a fulfillment plan for the tasks 130 based on the received solutions. For instance, the processor 102 may generate the fulfillment plan from the received allocation plans for the respective groups of tasks 130. The fulfillment plan may be an execution plan for implementing the tasks 130 that may identify which of the resources 140 are to implement or execute which of the tasks 130. The fulfillment plan may also identify the timing at which the resources 140 are to implement or execute each of the tasks 130.

The processor 102 may fetch, decode, and execute the instructions 222 to output the fulfillment plan. For instance, the processor 102 may output instructions to the resources 140 (or to controllers of the resources 140) to perform the tasks 130 according to the fulfillment plan.

The processor 102 may fetch, decode, and execute the instructions 224 to generate feedback regarding the fulfillment plan. The processor 102 may generate the feedback as part of a postprocessing operation. In addition, as part of the feedback generation, the processor 102 may evaluate the performance of the fulfillment plan. That is, for instance, the processor 102 may determine a fulfillment rate, total costs associated with the fulfillment plan, etc. The processor 102 may also output the feedback, e.g., may display the feedback, may store the feedback, etc., such that the fulfillment plan may be evaluated. The processor 102 may further generate reason codes for uncompleted tasks 130 and may include identifications of the uncompleted tasks 130 in the feedback.

Figure 3:
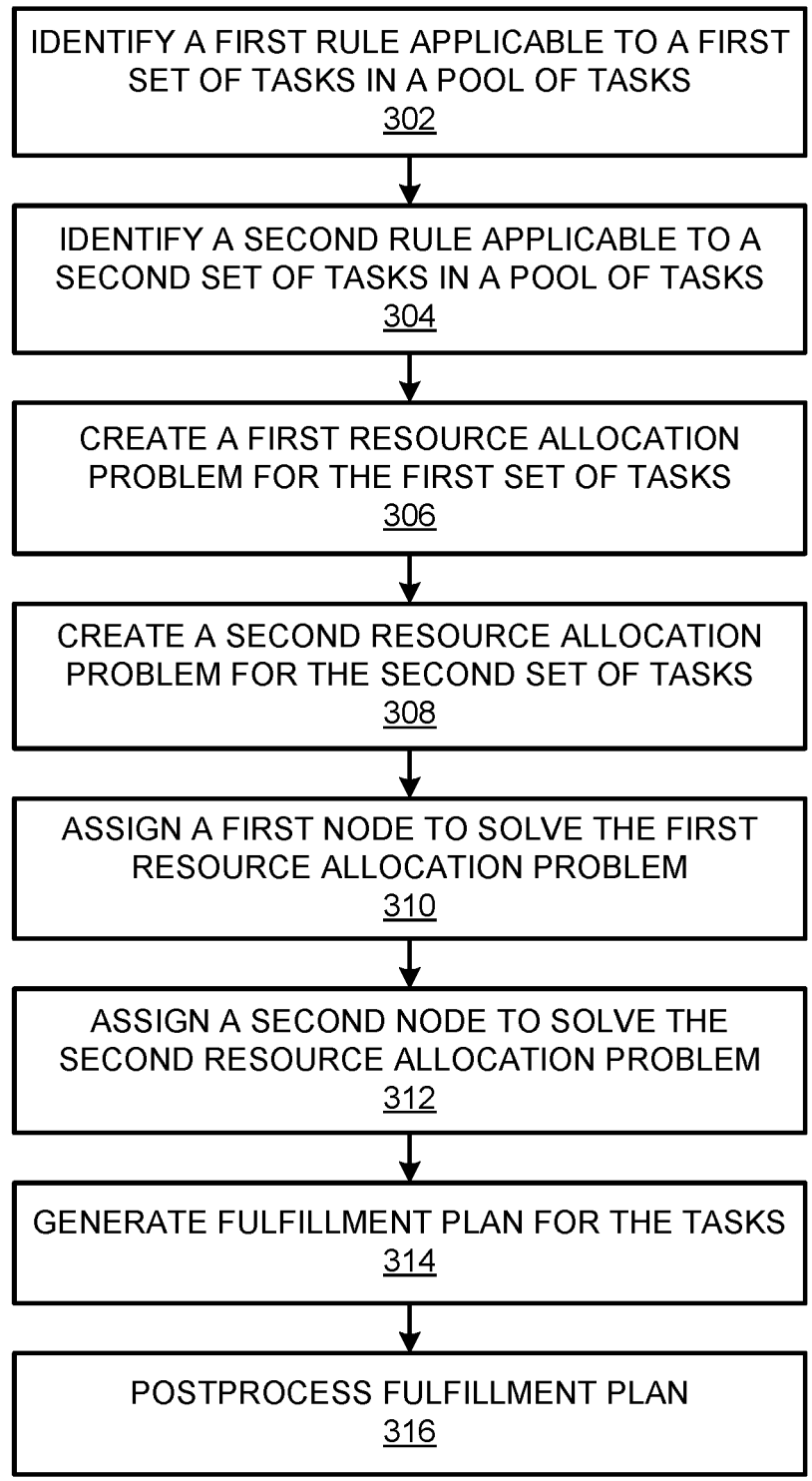
FIG. 3 depicts a flow diagram of a method for generating a fulfillment plan for a plurality of tasks in accordance with an embodiment of the present disclosure.

Various manners in which the processor 102 may operate are discussed in greater detail with respect to the method 300 depicted in FIG. 3. Particularly, FIG. 3 depicts a flow diagram of a method 300 for generating a fulfillment plan for a plurality of tasks in accordance with an embodiment of the present disclosure. It should be understood that the method 300 depicted in FIG. 3 may include additional operations and that some of the operations described therein may be removed and/or modified without departing from the scope of the method 300. The description of the method 300 is made with reference to the features depicted in FIGS. 1 and 2 for purposes of illustration.

According to examples, the processor 102 may identify a pool of tasks 130 that are to be carried out, implemented, invoked, executed, or the like. The pool of tasks 130 may include a number of tasks, e.g., hundreds or thousands of tasks, for which the processor 102 may generate a fulfillment plan. The fulfillment plan may include an identification of the resources 140 that are to carry out the tasks 130. Thus, for instance, the fulfillment plan may include an identification of the sources of items, e.g., packages, data packets, or the like, from which the items are to be obtained for delivery. As another example, the fulfillment plan may include an identification of resources 140, e.g., servers, computing devices, data storages, etc., that may execute the tasks 130, e.g., computing jobs. In any regard, the fulfillment plan may also include an identification of intermediate resources, such as, distribution centers, network switches, or the like, through which the items may be conveyed. The fulfillment plan may further include an identification of timings at which the items are to be delivered.

At block 302, the processor 102 may identify a first rule applicable to a first set of tasks 130 in the pool of tasks. In addition, at block 304, the processor 102 may identify a second rule applicable to a second set of tasks 130 in the pool of tasks. The first rule may be a rule with which the tasks in the first set of tasks 130 are to be in compliance and the second rule may be a rule with which the tasks in the second set of tasks 130 are to be in compliance. Thus, the first rule and the second rule may differ from each other. In one example, the first rule may be a first shipping priority date and the second rule may be a second shipping priority date. As another example, the first rule may be a first computing job requester priority level and the second rule may be a second computing job requester priority level.

At block 306, the processor 102 may create a first resource allocation problem for the first set of tasks 130. In addition, at block 308, the processor 102 may create a second resource allocation problem for the second set of tasks 130. The first resource allocation problem may be created as an equation, or the like, that includes as factors, rules and constraints applicable to the first set of tasks 130. The second resource allocation problem may also be created as an equation, or the like, that includes as factors, rules and constraints applicable to the second set of tasks 130. The first resource allocation problem and the second resource allocation problem may further include factors pertaining to an order in which some of the tasks may be completed.

The first resource allocation problem and the second resource allocation problem may further include a predefined goal that is to be achieved while completing or carrying out the tasks 130. The predefined goal may be, for instance, a greater compliance level with the rules and constraints, completion of the tasks with a minimized amount of resource utilization, completion of the tasks with a minimized amount of power consumption, and/or the like.

At block 310, the processor 102 may assign a first node of a plurality of nodes 150 to solve the first resource allocation problem. At block 312, the processor 102 may assign a second node of a plurality of nodes 150 to solve the second resource allocation problem. In addition, the processor 102 may direct the first node and the second node to respectively solve the resource allocation problems. The first node and the second node may employ the same solver or different solvers to respectively solve the resource allocation problems.

In any regard, the solution to the first resource allocation problem may identify which of the resources 140 are to carry out which of the tasks in the first set of tasks 130 such that the tasks may be carried out while meeting rules and constraints applicable to the tasks and while meeting a predefined goal. In other words, the solution to the first resource allocation problem may identify a first resource allocation plan for the first set of tasks 130. Likewise, the solution to the second resource allocation problem may identify which of the resources 140 are to carry out which of the tasks in the second set of tasks 130 such that the tasks may be carried out while meeting rules and constraints applicable to the tasks and while meeting a predefined goal. In other words, the solution to the second resource allocation problem may identify a second resource allocation plan for the second set of tasks 130.

At block 314, the processor 102 may generate a fulfillment plan for the tasks 130 using the solutions that the first node and the second node have generated. For instance, the processor 102 may generate the fulfillment plan to include a combination of the solutions. However, the processor 102 may also determine whether execution of a received solution of the received solutions violates a rule or a constraint. By way of example, the processor 102 may determine that execution of a received solution may result in a task not being implemented as set forth in the solution because the identified source of an item has reached a maximum order limit for the day. Based on a determination that execution of a received solution may violate a rule or a constraint, the processor 102 may reject the solution, may identify the resource allocation problem corresponding to the rejected solution, and may assign a node to solve the identified resource allocation problem with the violated rule as a constraint to the identified resource allocation problem. The processor 102 may also update or generate the fulfillment plan with a new solution to the identified resource allocation problem.

The processor 102 may output the generated fulfillment plan to the resources 140 or to controllers of the resources 140 such that the resources 140 may carry out the tasks 130 according to the generated fulfillment plan. The processor 102 may also generate additional fulfillment plans as additional tasks 130 to be carried out are identified.

At block 316, the processor 102 may postprocess the generated fulfillment plan. That is, the processor 102 may track and log the fulfillment plan and a success rate of the fulfillment plan. The processor 102 may also determine costs associated with execution of the fulfillment plan as well as which rules may have been violated in the execution of the fulfillment plan. The processor 102 may further output information pertaining to the postprocessing such that a user may evaluate the fulfillment plan.

Figure 4:
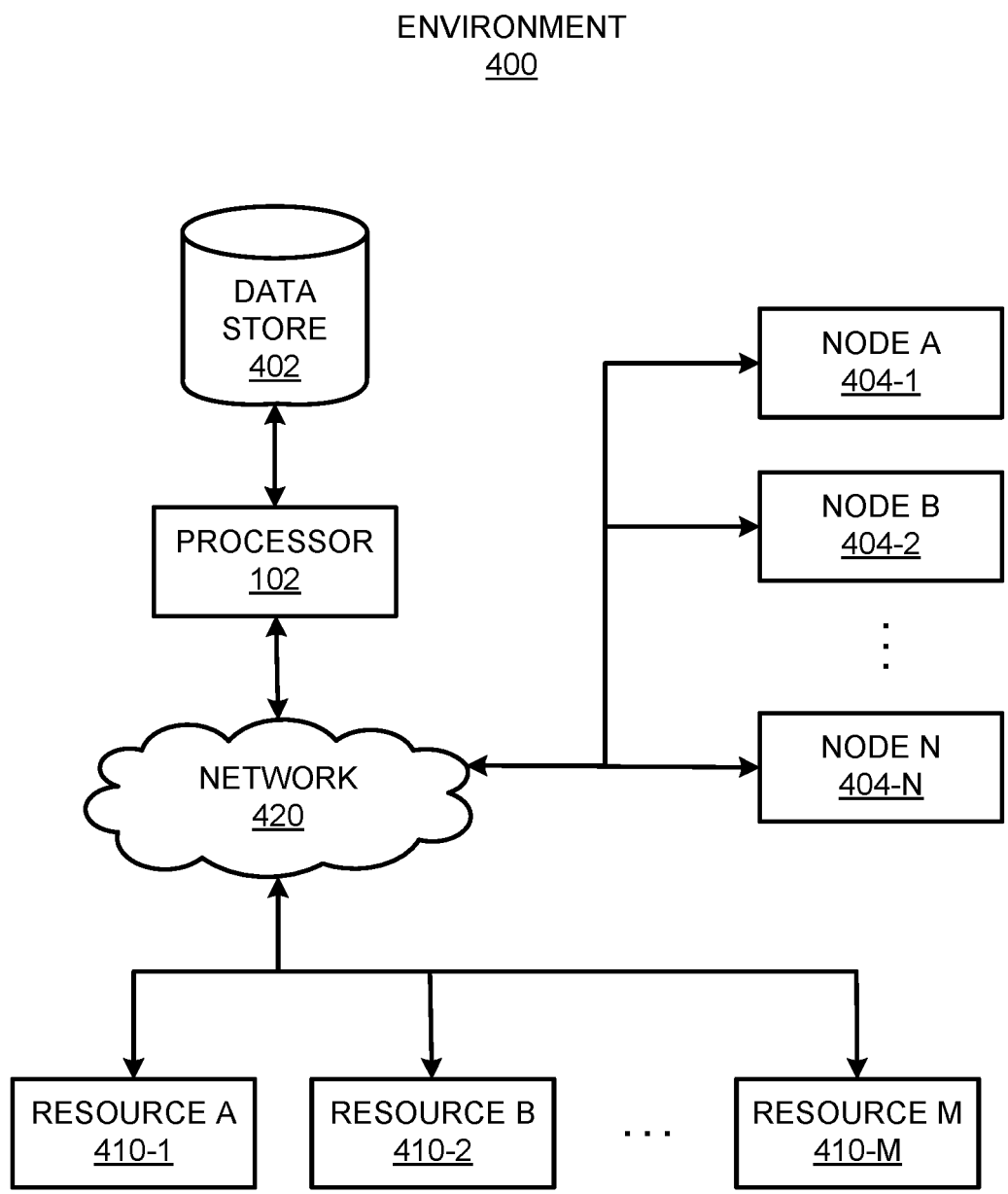
FIG. 4 depicts a block diagram of an example environment in which features of the present disclosure may be implemented in accordance with an embodiment of the present disclosure.

Reference is now made to FIG. 4, which depicts a block diagram of an example environment 400 in which features of the present disclosure may be implemented in accordance with an embodiment of the present disclosure. It should be understood that the environment 400 depicted in FIG. 4 may include additional components and that some of the components described herein may be removed and/or modified without departing from a scope of the environment 400

The environment 400, which may also be referenced as an infrastructure, is depicted as including a processor 102 and a data store 402. The processor 102 may be equivalent to the processor 102 discussed herein with respect to FIGS. 1-3. The data store 402 may be, for example, Random Access memory (RAM), an Electrically Erasable Programmable Read-Only Memory (EEPROM), a storage device, an optical disc, or the like. In addition, the data store 402 may store the task information 230, the resources information 240, the rules, constraints, and goals 242, etc.

Also shown in FIG. 4 are a plurality of nodes 404-1 to 404-N and a plurality of resources 410-1 to 410-M. The variables "N" and "M"" may each represent a value greater than 1 and may differ from each other. The nodes 404-1 to 404-N may each be a servers, a processor, a CPUs, or other processing device and the may be located in a single location or located at multiple locations, e.g., data centers. In some examples, the nodes 404-1 to 404-N may be collocated with the processor 102 while in other examples, the nodes 404-1 to 404-N may be located externally to the processor 102. The resources 410-1 to 410-M may be entities or components that may carry out tasks 130 or portions of the tasks 130. In any regard, the processor 102 may communicate with or otherwise send instructions to the nodes 404-1 to 404-N and the resources 410-1 to 410-M via a network 420, which may be the Internet, an intranet, or the like.

In a first example, the tasks 130 may be computing jobs that a distributed set of resources 410-1 to 410-M are to execute. For instance, the processor 102 is to allocate the resources 410-1 to 410-M to execute the computing jobs while complying with a predefined goal. The resources 410-1 to 410-M may be cloud-based resources, such as servers, CPUs, service instance endpoints database servers, file shares, storage servers, or the like. In this example, the rules applicable to the tasks 130 may be editable business or customer driven rules. Examples of the rules may include rules on grouping computing jobs. These rules may include grouping computing jobs by priority, e.g., job request time, job requester priority, length of time in a queue, operation optimization, etc. The rules may additionally or alternatively include grouping computing jobs by completion deadline, by resource requirements, e.g., computing jobs requesting the same service endpoint, by required location of resources for compliance with regulatory requirements, etc. Other examples of the rules may include rules for individual computing jobs, such as, a job execution deadline rule that may define an execution deadline time for an individual computing job.

Additional rules for the computing jobs may include a job splitting rule in which some jobs may be split into sub-jobs to be executed independently (e.g., map-reduce jobs for big-data computation), while some jobs cannot be split; a computing job resource requirement rule in which a minimum resource requirement may be imposed, e.g., a computing job requires 5 MB of storage space and minimum 2 CPU cores; geographical restrictions/rules in which certain computing jobs may only be executed in a given geographic location; or the like.

Rules may also be applicable to the resources 410-1 to 410-M. These rules may include, for instance, an instantiate more resource rule in which additional resources may be instantiated when a percentage utilization of a certain resource type exceeds a certain threshold, e.g., 90%; a shut down resource for maintenance rule in which a resource may be shut down when a percentage utilization of a certain resource type drops to a certain threshold, e.g., 0%; an eligibility to use rule in which computing jobs executing under a certain privilege are given access to a given resource; a maximum simultaneous computing job sharing resource rule in which a limit may be imposed on a number of computing jobs that a resource may host at a given time; a geographical restrictions/rules in which certain resources may be available for computing jobs from a given geographic location; or the like. Additional rules may be applicable to a network on which the resources 410-1 to 410-N reside, such as, a maximum cost rule in which a maximum cost may be imposed regarding allocations of computing jobs to the resources 410-1 to 410-N may remain below a certain maximum cost level.

According to examples, the processor 102 may store various information in the data store 402. The information may include, for instance, identification of a set of resources 410-1 to 410-M that are currently executing a set of computing jobs. The information may also include details of computing jobs waiting to be executed, such as computing job deadlines, priorities, resource requirements, etc. The information may further include resource details pertaining for available resources 410-1 to 410-M, such as resource percentage utilizations, resource usage costs, and/or other properties.

The processor 102 may perform a preprocessing operation in which the processor 102 may pull data from a database (e.g., data stored in the data store 402). The processor 102 may pull various types of data, including, computing jobs waiting to be executed that have not yet been allocated, resources 410-1 to 410-M available for allocation, rules applicable to the computing jobs (e.g., tasks 130) and the resources 410-1 to 410-M, etc.

The processor 102 may also decompose a resource allocation problem for all of the computing jobs waiting to be executed into multiple smaller resource allocation problems for groups of the computing jobs. For instance, the processor 102 may group computing jobs based on rules (e.g., computing jobs with high priority, computing jobs that have geographical restrictions, etc. In addition, the processor 102 may construct a list of valid resources 410-1 to 410-M for each of the groups based on rules (e.g., resource availability, percentage utilization, cost that will be incurred, etc. The processor 102 may further construct a delivery network for each of the groups with available active resources 410-1 to 410-M based on rules (e.g., maximum cost, how geographical restrictions may affect network collection, etc.).

The resource allocation problems may include as factors, various rules and information pertaining to the resources 410-1 to 410-M that may execute the groups of computing jobs. The various rules and information may include wait-times of the resources 410-1 to 410-M, utilization levels (e.g., percentages) of the resources 410-1 to 410-M, statuses of the resources 410-1 to 410-M, rules (e.g., maximum number of computing jobs allowed, geographical restrictions, etc.) applicable the resources, etc. The resource allocation problems may also include as factors, various rules and information pertaining to the computing jobs (tasks 130). The various rules and information pertaining to the computing jobs may include, for instance, resource requirements of the computing jobs, sizes of the computing jobs, priorities of the computing jobs, rules (e.g., maximum processing times, costs, geographical restrictions, whether the computing jobs may be split, etc.) applicable to the computing jobs, etc.

The processor 102 may make each resource allocation problem an optimization problem in which a predefined goal is to be met in the solution to the resource allocation problem. The processor 102 may also analyze relationships among the resource allocation problems to, for instance, determine whether some of the resource allocation problems are to be processed after processing of some other resource allocation problems, whether some resource allocation problems may be processed independently from other resource allocation problems, etc. The processor 102 may assign each of the resource allocation problems to a respective node 404-1 to 404-N. In addition, the nodes 404-1 to 404-N may solve a respective one of the resource allocation problems to create an allocation plan for a group of computing jobs that meets a predefined goal, e.g., minimizes costs associated with processing the computing jobs. The nodes 404-1 to 404-M may solve the resource allocation problems in parallel with each other or substantially in parallel with each other.

As also discussed herein, the processor 102 may perform a postprocessing operation. In the postprocessing operation, the processor 102 may apply postprocessing rules to the solutions received from the nodes 404-1 to 404-N. For instance, the processor 102 may determine whether a solution, e.g., a computing job allocation plan, violates a constraint rule. If so, the processor 102 may modify the computing job allocation plan accordingly if possible and may otherwise remove the computing job allocation plan for that computing job. For example, if a computing job A will potentially exceed its maximum waiting time waiting for resource B allocated to it, the processor 102 may cancel the allocation of the computing job A to resource B and may add computing job A back to a list of computing jobs that are waiting for resource allocation.

The processor 102 may combine the solutions, e.g., allocation plans, to generate a fulfillment plan for the computing jobs. The processor 102 may also evaluate the performance of the fulfillment plan in terms of, for instance, a computing job execution rate, total operational costs, resource utilization percentage, tracing, etc. The processor 102 may further generate reason codes for computing jobs that may have been waiting for an extended period of time and may collect information about long wait times for resources 410-1 to 410-M to detect deadlocks or bottlenecks. The processor 102 may still further update a database, send allocation plans to the database, send performance evaluations to the database, send records of tracing rules to the database, generate analytical reports, or the like.

In a second example, the tasks 130 may be orders for items, e.g., products, goods, etc., that are to be fulfilled by a distributed set of resources 410-1 to 410-M. The resources 410-1 to 410-M in this example may be a plurality of item providers (e.g., sources or providers of the items, which may include manufacturers, distributors, etc.), a plurality of intermediaries (e.g., distribution hubs, stores, etc.), available items, inventory levels of the items, and/or the like. The processor 102 may determine, for instance, given a set of sales orders, available retail stores/warehouses, current inventory levels of all ordered items, etc., an optimized sales order-retail store/warehouse assignment (fulfillment plan) to achieve a predefined goal. The predefined goal may include, for instance, minimize shipping cost, maximize customer satisfaction level while satisfying rules and constraints, and/or the like. The process of order fulfillment may be an ongoing process which may be set up for recurring execution periodically based on the volume and rate of orders being generated.

In this example, the rules applicable to the tasks 130 may be editable business or customer driven rules. Some of these rules may naturally decompose the problem of fulfilling all pending orders to smaller problems. Some examples of rules may include rules on grouping orders, such as:

Grouping orders by order creation time, as well as the maximum number of order lines allowed in a group. An order line may refer to an individual item contained in an order of any quantity, an order may contain multiple order lines, etc.

Grouping orders by shipping method, e.g., overnight shipping, two-day shipping, ground shipping, or the like.

The examples of rules may include rules on each order, which may be customer rules or retailer rules, such as:

Order delivery deadline, in which a customer may request the order to be delivered within a set timeframe, e.g., two business days.

Order split into shipments rules, in which a customer may request that the order be split in at most a predefined number of separate packages.

Order delivery schedule rule, in which a customer may request the order to be delivered in whole or as soon as each product is ready to ship, which may cause the number of shipments to vary.

A rule that enables a customer to choose to pick up an order from a store.

A rule in which a retail store may reject an order to which the retail store was allocated due to unforeseen reasons, e.g., for damaged products.

The examples of rules may include rules on retail stores/warehouses, such as:

Nearest warehouse rule, in which all items are supplied through the warehouse/store nearest to the customer location.

A rule in which eligible stores/warehouses are to ship to certain locations (e.g.,: orders originating outside of the US should always be fulfilled by a warehouse located in the US.

A rule in which eligible stores/warehouse are to ship certain items (e.g., recreational sports equipment orders should always be shipped from a particular warehouse).

A store and warehouse offline/online rule, in which stores may go down for maintenance or construction.

A rule in which maximum orders that can be fulfilled by stores in a day is preset.

A minimum inventory level rule in which stores should maintain a minimum inventory level of items. For instance, an order should not be assigned to a store that has an inventory level equal to or below the minimum inventory level.

The examples of rules may include rules on item catalogs or inventory, such as:

Grouping items rule, in which certain item pairs should always be shipped together as a kit. For instance, a kayak should always be shipped together with a paddle.

Item sourcing constraints, in which certain items should always be shipped from a warehouse.

The examples of rules may include rules on routing, such as:

Maximum cost rule, in which shipping from store A to hub B will incur cost of transportation, fuel, etc., to help control the costs associated with shipping the items.

Maximum distance rule, in which the items should be fulfilled from stores and warehouses within a predefined maximum distance from a customer location.

According to examples, the processor 102 may store various information in the data store 402. The various information may include, for instance, information pertaining to the orders for the items (tasks 130), information pertaining to retail stores and warehouses info (e.g., inventories, addresses, etc.), information pertaining to the rules applicable to the orders and the resources 410-1 to 410-M, information pertaining to the scheduled deliveries of the items, etc.

As discussed herein, the processor 102 may perform a preprocessing operation. In the preprocessing operation, the processor 102 may pull data from a database, which may be stored in the data store 402. The processor 102 may pull various types of data, including, orders (e.g., tasks 130) to be processed, information pertaining to retail stores and warehouses (e.g., resources 410-1 to 410-M), information pertaining to the applicable rules, etc.

The processor 102 may also decompose a resource allocation problem for all of the orders waiting to be processed into multiple smaller resource allocation problems for groups of the orders. For instance, the processor 102 may group orders based on rules (e.g., delivery dates, shipping priority rules, no cross-zone shipping rules, etc. . . . In addition, the processor 102 may construct a list of valid providers (e.g., resources 410-1 to 410-M) for each of the groups based on rules (e.g., store/warehouse management rules such as minimum inventory rules, store offline rules, etc.). The processor 102 may further construct a delivery network for each of the groups with available active resources 410-1 to 410-M based on rules (e.g., delivery rules such as order rejection, maximum shipping distance, etc.).

The resource allocation problems may include as factors, various rules and information pertaining to the resources 410-1 to 410-M that may carry out the task of fulfilling the orders. The various rules and information may include, for each potential provider (e.g., resource 410-1 to 410-M), the items that the provider carries, inventory levels of the items, an address of the provider, rules applicable to the provider, etc. The various rules and information may also include, for each potential distribution hub (e.g., resource 410-1 to 410-M), an address of the distribution hub, rules applicable to the distribution hub, etc. The various rules and information may also include, for each order destination, an address of the order destination, rules applicable to the order destination, items ordered, quantities of the items ordered, etc.

The various rules and information may further include rules and information pertaining to connections between the potential providers, the potential distribution hubs, and the order destinations. These rules and information may include, delivery costs associated with the connections, delivery times associated with the connections, rules associated with the connections, etc.

The processor 102 may make each resource allocation problem into an optimization problem in which a predefined goal is to be met in the solution to the resource allocation problem. The processor 102 may also analyze relationships among the resource allocation problems to, for instance, determine whether some of the resource allocation problems are to be processed after processing of some other resource allocation problems, whether some resource allocation problems may be processed independently from other resource allocation problems, etc. The processor 102 may assign each of the resource allocation problems to a respective node 404-1 to 404-N. In addition, the nodes 404-1 to 404-N may solve a respective one of the resource allocation problems to create an allocation plan for a group of orders (e.g., tasks 130) that meets a predefined goal, e.g., minimizes costs associated with delivering the items, maximizes a customer satisfaction level, etc. The nodes 404-1 to 404-M may solve the resource allocation problems in parallel with each other or substantially in parallel with each other.

As also discussed herein, the processor 102 may perform a postprocessing operation. In the postprocessing operation, the processor 102 may apply postprocessing rules to the solutions received from the nodes 404-1 to 404-N. For instance, the processor 102 may determine whether a solution, e.g., an order allocation plan, violates a constraint rule. If so, the processor 102 may modify the order allocation plan accordingly if possible and may otherwise remove the order allocation plan for that computing job. For example, if a store A has met its maximum order limit for the day, the processor 102 may reject the order allocation plan for all further orders being allocated to that store. In addition, the processor 102 may place the orders back into the pool of orders to be processed during a next fulfillment plan generation process.

The processor 102 may combine the solutions, e.g., allocation plans, to generate a fulfillment plan for the orders. The processor 102 may also evaluate the performance of the fulfillment plan in terms of, for instance, an order execution rate, total operational costs, resource utilization percentage, tracing, etc. The processor 102 may further generate reason codes for orders that may have been waiting for an extended period of time and may collect information about long wait times for resources 410-1 to 410-M to detect deadlocks or bottlenecks. The processor 102 may still further update a database, send allocation plans to the database, send performance evaluations to the database, send records of tracing rules to the database, generate analytical reports, or the like.

Figure 5:
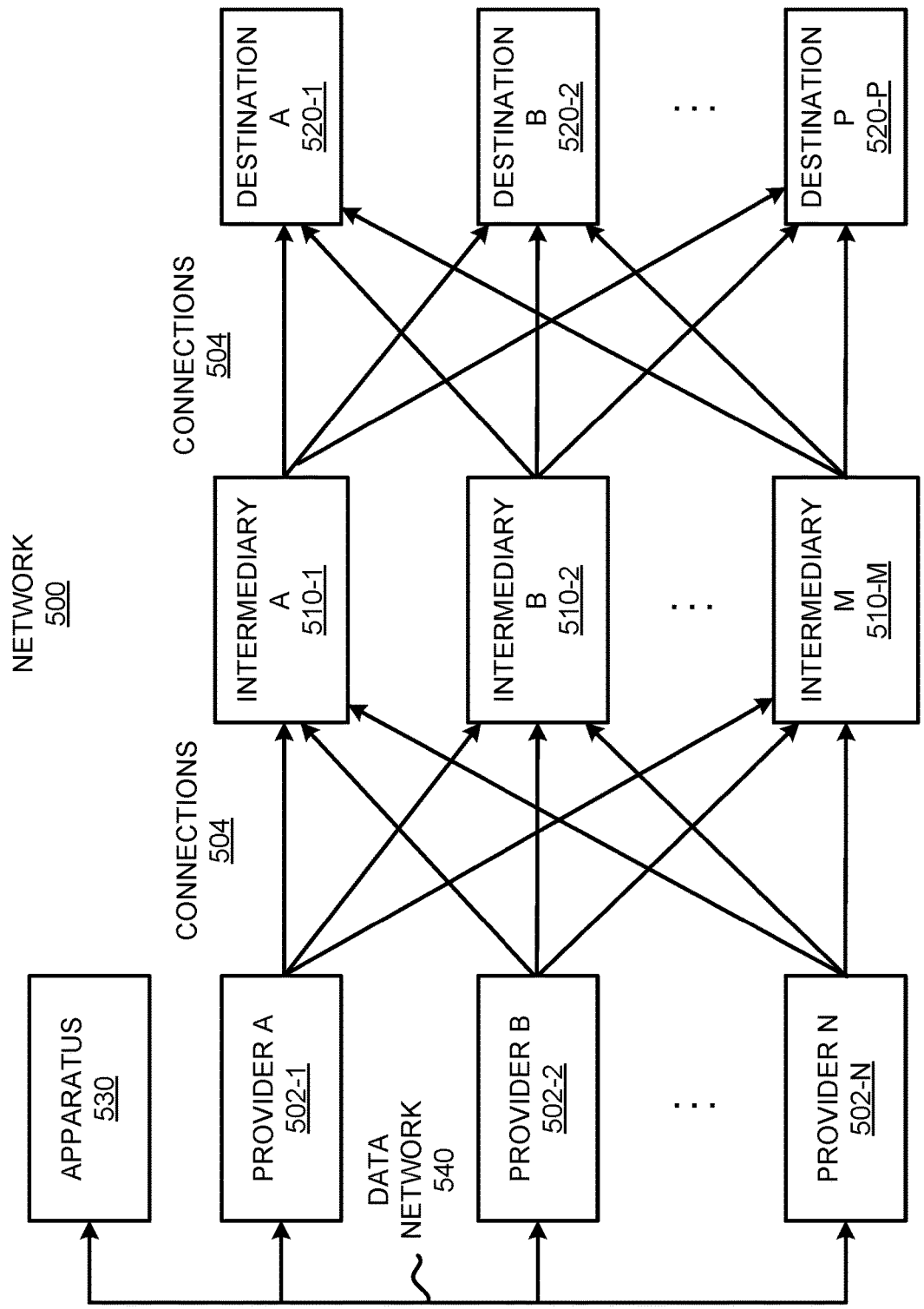
FIG. 5 shows a block diagram of an example network in which features of the present disclosure may be implemented in accordance with an embodiment of the present disclosure.

With reference now to FIG. 5, there is shown a block diagram of an example network 500 in which features of the present disclosure may be implemented in accordance with an embodiment of the present disclosure. It should be understood that the network 500 depicted in FIG. 5 may include additional components and that some of the components described herein may be removed and/or modified without departing from a scope of the network 500.

The network 500, which is also referenced herein as an infrastructure, is depicted as including a plurality of providers 502-1 to 502-N (which are referenced herein collectively as providers 502), a plurality of intermediaries 510-1 to 510-M (which are referenced herein collectively as intermediaries 110), and a plurality of destinations 520-1 to 520-P (which are referenced herein collectively as destinations 520). The variables "N," "M," and "P" may each represent a value greater than 1 and may differ from each other. Additionally, connections 504 are depicted between the providers 502 and the intermediaries 510 and connections 506 are depicted between the intermediaries 510 and the destinations 520.

Generally speaking, the network 500 is a network over which items may be delivered from the providers 502 to the destinations 520 via the intermediaries 510. The items may be packets of data, products that are sold in commerce, and the like. In examples in which the items are packets of data, the providers 502 may be servers, data storage locations, service providers, or the like that may communicate the packets of data over a communications network, such as the Internet. In these examples, the intermediaries 510 may be network components, such as routers, switches, servers, data centers, or the like, through which the packets of data from the providers 502 may be routed or traversed. In addition, the destinations 520 may be computing devices that are assigned with respective IP addresses that may be used as destination addresses for the data packets from the providers 502.

In examples in which the items are products, the providers 502 may be physical stores, warehouses, etc., at which the products may be stored and from which the products may be provided. In addition, the intermediaries 510 may be distribution centers, product shipping companies, etc., that may facilitate or may otherwise be involved in the delivery of the products to the destinations. In some examples, the same physical store, warehouse, distribution center, etc., may be considered to be both a provider 502a and an intermediary 510a. The destinations 520 may be businesses, homes, etc., to which the products may be delivered.

As shown in FIG. 5, items may traverse any of a number of different paths from the providers 502, through the intermediaries 510, and to the destinations 520 via the connections 504, 506. The different paths may be associated with different delivery costs and/or delivery timeframes with respect to each other. For instance, delivering an item through a first path may result in the incursion of a first monetary cost and a first delivery timeframe, while delivering the item through a second path may result in the incursion of the same monetary cost but may incur a second delivery timeframe. Additionally, restrictions on which of the paths the item may traverse may exist based upon set policies and rules and thus, the item may not be delivered through those paths upon which the restrictions apply. As discussed herein, candidate fulfillment plans of the possible paths that the item may traverse may be evaluated and the candidate fulfillment plan having the maximum compliance with a set of factors may be selected for delivery of the item. For instance, the candidate fulfillment plan resulting in the incursion of the lowest amount of monetary cost and the shortest delivery timeframe may be selected for delivery of the item.

According to examples, an apparatus 530 may receive orders for the items to be delivered to the destinations 520. For instance, the apparatus 530 may provide a portal or user interface through which a user may place the orders for the items. In other examples, the apparatus 530 may receive the orders for the items from another apparatus or service. In any regard, delivery of the items may be construed as an order fulfillment problem and the apparatus 530 may include a processor that may build a rule-based model, e.g., a model that may be specified by rules, of the order fulfillment problem. That is, the processor may model the order fulfillment problem as a network of potential providers, potential intermediaries, and a group of unfilled orders. In addition, the processor may implement a heuristic method to solve the order fulfillment problem in a manner that may result in compliance with a plurality of factors pertaining to the delivery of the items in the orders being maximized among the possible fulfillment plans.

The apparatus 530 may also output instructions for the items to be delivered over the network 500 according to the fulfillment plan that is determined to maximize compliance with the plurality of factors among the candidate fulfillment plans. For instance, the apparatus 530 may output the instructions to the providers 502 over a data network 540, which may be the Internet, a cellular network, a telephone network, etc. In response to receipt of the instructions from the apparatus 530, the providers 502 may initiate delivery of the items. By way of example in which the items are data packets, the providers 502 may insert the appropriate routing and destination IP addresses as well as any other information into the data packets to cause the data packets to be routed through a particular intermediary 510-1 and to a particular destination 520-1. In another example in which the items are products, the providers 502 may mark the products to be delivered to a particular intermediary 510-1 and to a particular destination 520-1.

Figure 6:
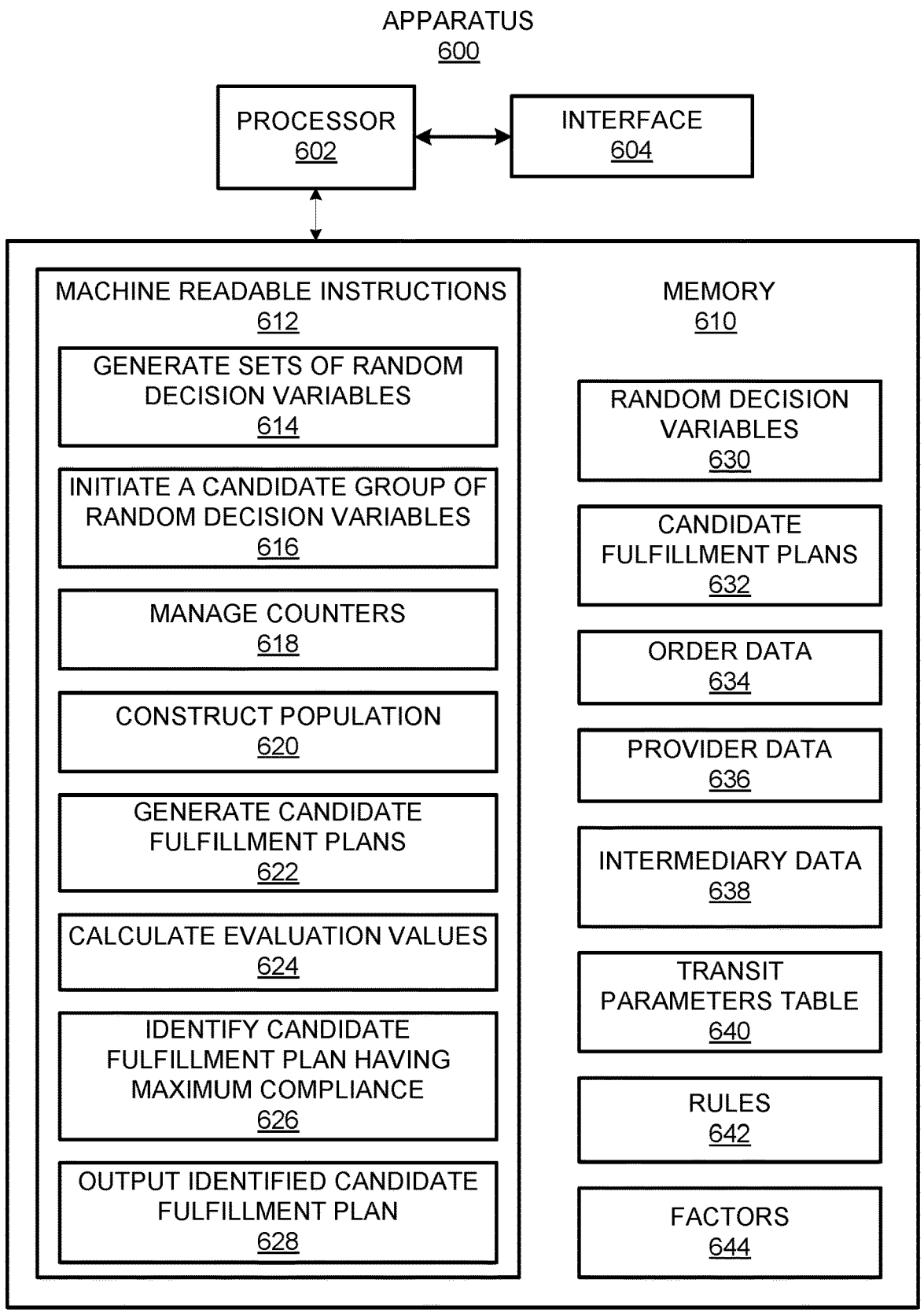
FIG. 6 shows a block diagram of an apparatus in accordance with an embodiment of the present disclosure.

Turning now to FIG. 6, there is shown a block diagram of an apparatus 600 in accordance with an embodiment of the present disclosure. The apparatus 600 may be equivalent to the apparatus 530 shown and discussed above with respect to FIG. 5. Additionally, the apparatus 600 may be a computing device, a server computer, etc. It should be understood that the apparatus 600 depicted in FIG. 6 may include additional components and that some of the components described herein may be removed and/or modified without departing from a scope of the apparatus 600.

As shown, the apparatus 600 may include a processor 602 that may control operations of the apparatus 600. The processor 602 may be a semiconductor-based microprocessor, a central processing unit (CPU), an application specific integrated circuit (ASIC), a field-programmable gate array (FPGA), and/or other hardware device. Although the apparatus 600 has been depicted as having a single processor 602, the apparatus 600 may include multiple processors 602 that may perform multiple processing operations concurrently.

The apparatus 600 may also include a memory 610 that may have stored thereon machine readable instructions 612 (which may also be termed computer readable instructions) that the processor 602 may execute. The memory 610 may be an electronic, magnetic, optical, or other physical storage device that contains or stores executable instructions as well as other data. The memory 610 may be, for example, Random Access memory (RAM), an Electrically Erasable Programmable Read-Only Memory (EEPROM), a storage device, an optical disc, and the like. The memory 610, which may also be referred to as a computer readable storage medium, may be a non-transitory machine-readable storage medium, where the term "non-transitory" does not encompass transitory propagating signals. Although the apparatus 600 has been depicted with a single memory 610, the apparatus 600 may include multiple memories 610 that may be included in the apparatus 600 and/or may be external to the apparatus 600.

The processor 602 may fetch, decode, and execute the instructions 614 to generate random decision variables. A random decision variable may be defined as an artificially defined array with random values ranging between 0 and 1, which may be used to generate a candidate fulfillment plan as discussed herein. In addition, the processor 602 may fetch, decode, and execute the instructions 616 to initiate or select a candidate group of random decision variables. The processor 602 may fetch, decode, and execute the instructions 618 to manage counters, e.g., an outer counter and an inner counter, which are also referenced herein as a first counter and a second counter, respectively. The processor 602 may fetch, decode, and execute the instructions 620 to construct a population based upon a selection of decision variables with a probability determined from a candidate group of random decision variables. The processor 602 may fetch, decode, and execute the instructions 622 to generate candidate fulfillment plans to fulfill orders for delivery of items through use of the random decision variables. Thus, for instance, a separate random decision variable may be used to generate a separate candidate fulfillment plan.

The processor 602 may fetch, decode, and execute the instructions 624 to calculate an evaluation value (which is also referenced herein as a score) for each of the generated candidate fulfillment plans. The processor 602 may fetch, decode, and execute the instructions 626 to identify the candidate fulfillment plan having the evaluation value that corresponds to a maximized compliance with a plurality of factors pertaining to the delivery of items. For instance, the processor 602 may identify the candidate fulfillment plan having the lowest evaluation value. The processor 602 may fetch, decode, and execute the instructions 628 to output instructions to deliver the items over the network 500 according to the identified candidate fulfillment plan.

The processor 602 may output the instructions through an interface 604, which may include hardware components, software components, or a combination of hardware and software components to facilitate the communication of data from and to the processor 602. According to examples, the interface 604 may be an interface to an external network such as the Internet.

As also shown in FIG. 6, the memory 610 may have stored thereon random decision variables 630. The random decision variables 630 may be the processor 602 generated random decision variables or random decision variables that may have been generated by another device and supplied to the apparatus 600. In any regard, and as discussed in greater detail herein, the processor 602 may use the random decision variables 630 to generate a plurality of candidate fulfillment plans 632, which may also be stored on the memory 610.

The memory 610 may also have stored thereon order data 634, provider data 636, and intermediary data 638. The order data 634 may identify orders for items that are to be delivered over the network 500. The order data 634 may identify orders that have been fulfilled and orders that have not yet been fulfilled. The order data 634 may also include information associated with the orders, such as a list of items (e.g., data packets, products, etc.) included in the orders, quantities of each of the items in the orders, a delivery address or delivery addresses of the orders (e.g., the IP address of the destination 520-1, the postal address of the destination 520-1, etc.), rules associated with the orders (e.g., all of the ordered items are to arrive together and in a certain sequence, all of the ordered items should arrive within a certain timeframe, the number of items associated with the order being sent to the shipping address should be less than a certain number, etc.), and the like.

The provider data 636 may identify the providers 502 in the network 500. The provider data 636 may also include an identification of the data stored/inventories of the providers 502 and/or access to the data stored/inventories of the providers 502. The provider data 636 may also include information associated with the providers 502 such as, for each of the particular providers 502:

- a list of items associated to the orders;
- available inventory of the items (e.g., stored data packets) listed in the orders;
- a delivery address of the items; and
- rules associated with a destination (e.g., all of the items sent to the same address should be sent as one package, etc.).

The intermediary data 638 may identify the intermediaries 510 in the network 500. The intermediary data 638 may also include information associated with the intermediaries 510 such as, for each of the intermediaries 510, a delivery address, rules associated with the intermediary 510 (e.g., all items sent from an intermediary 510 to the same destination address should be sent as one package), etc.

The memory 610 may further have stored thereon a transit parameters table 640 that may provide related parameters of transiting items from the providers 502 to the intermediaries 510 and from the intermediaries 510 to the destinations 520 for the orders. The related parameters may include delivery cost, delivery time, etc. Examples of delivery cost may include costs associated with routing packets through an IP network, shipping fees, or the shipping distance, or any other parameters that directly relate to the cost of handling items. In instances in which a provider 502-1 is both a provider and an intermediary in a candidate fulfillment plan, the transit cost within such a provider is zero.

The delivery time may be defined as a parameter that indicates the delivery time of transiting items from a provider to an intermediary and/or from an intermediary to a destination. In instances in which a provider 502-1 is both a provider and an intermediary 510-1 for the provider 502-1 in a candidate fulfillment plan, the transit time for the provider and the intermediary is zero. Information associated with the transit parameters table may include for instance:

- Delivery cost and delivery time;
- Rules associated with the corresponding transit. For example, an extreme weather rule may be active in which the transit between a provider and an intermediary may temporarily not be allowed (in this case, the delivery costs of all delivery types may be set to infinity in the transit parameters table) or the transit from a provider to an intermediary may always be restricted. As another example, a service disruption rule may be active in which the transmission of data packets is temporarily not possible (in this case, the delivery costs of all delivery types may be set to infinity in the transit parameters table).

The memory 610 may further have stored thereon a plurality of rules 642 that may specify how the unfilled orders identified in the order data 634 are to be grouped, which providers 502 should be selected as potential providers of the items identified in the orders, etc. Examples of the rules on grouping the orders may include:

- Group the orders by order creation time, as well as the maximum number of order lines allowed in a group. An order line may refer to an individual item included in an order of any quantity and an order may contain multiple order lines.
- Group the orders by shipping method, e.g., packets contained in the same package, overnight shipping, two day shipping, ground shipping, etc.

The rules 642 may also specify particular rules that may be enforced on the delivery of the items. A user, a provider 502, and/or an intermediary 510 may specify the rules 642 through, for instance, a user interface, e.g., a website. Examples of the rules on each of the orders may include:

- A user may indicate that all of the items be received within a particular number of days. This rule may specify a delivery constraint of the rule-based model discussed herein, e.g., the delivery time from providers 502 to destinations 520 to be less than or equal to the particular number of days.
- A user may indicate that the ordered items be delivered in at most a particular number of separate packages, in which the transition cost of the rule-based model is cost per package. This rule may specify a number of intermediaries 510 constraint of the rule-based model discussed herein, e.g., the number of the intermediaries 510 chosen from the potential intermediaries 510 should be no more than the particular number of separate packages.
- A user may indicate that the ordered items be shipped as a single package, in which the transition cost of the rule-based model is cost per package. This rule may specify the number of intermediaries 510 constraint of the rule-based model, e.g., the number of the intermediaries 510 chosen among the potential intermediaries to deliver the items should be exactly one.
- A user may indicate that the items of all orders be delivered as soon as possible. This rule may specify an objective function of the rule-based model, e.g., the goal of the rule-based model may be to minimize the delivery time of fulfilling the order.
- A user may choose a local store to pick up the items that were ordered online. This rule may specify the location of the user, which may not be the address of the user, but the address of the chosen local store.
- A provider 502 may set rules to reject orders that have certain features or to reject certain types of orders.
- An intermediary 510 may set rules to reject orders that have certain features or to reject certain types of orders.

The rules 642 may further specify particular rules that are applicable to the providers 502. The providers 502 may specify these rules 642 through, for instance, a user interface, e.g., a website. Examples of these rules may include:

- Nearest warehouse policy. In this rule, all of the items an order should be sent from providers to an intermediary that is nearest to the destination of the items and the intermediary should send the items together to destination. This rule may specify the potential intermediaries appearing in the network, e.g., according to the rule, the rule-based model should automatically find the intermediary nearest to the destination, and set that intermediary to be the only potential intermediary in the network for the order.
- Available local stores within a certain distance policy. In this rule, if the destination is located in an area in which multiple stores may be chosen as potential providers, then the providers that have the items available and are within a certain distance, e.g., 10 miles, from the destination should be set as potential providers. In response to the total available items being found within the certain distance can only partially fulfill the order, then increase the searching distance by an additional distance, e.g., another 10 miles, each time until enough available items are found.
- Ineligible potential intermediaries policy. In this rule, if the ordered items belong to a certain type, then only certain ones of the intermediaries may be selected as potential intermediaries of the items. Likewise, if the ordered items belong to another certain type, then certain ones of the intermediaries cannot be selected as potential intermediaries of the items. This rule may restrict the choice of potential intermediaries in the network.

All items should be shipped directly from chosen providers to destinations. This rule may eliminate the potential intermediaries in the network. According to examples, instead of eliminating the potential intermediaries from the network 500, the destination may be set as the only potential intermediary and the transition cost and the transition time from the potential intermediary to the destination may be set to be zero.

At most a certain number of potential providers may be chosen as the final providers to fulfill the order. This rule may specify a number of provider constraint of the rule-based model, e.g., the number of the providers selected among the potential providers to fulfill an order should be no more than the certain number.

An on-line retailer may prefer to minimize the number of providers selected among the potential providers to fulfill the order. This rule may specify the objective function of the rule-based model, e.g., the goal of the rule-based model may be to minimize the number of providers to fulfill the customer order.

The rules 642 may further specify particular rules that are applicable to the intermediaries 510. Examples of these rules may include: If a store is chosen as a provider, the store has to ship items directly to the destination. In this case, for example, the transit from the store to the any potential intermediaries may be restricted, e.g., the items may only be allowed to transit within the store.

The rules 642 may further specify particular rules that are applicable to the shipping methods. Examples of these rules may include: for the same transit connection, multiple intermediaries may be selected to send a package containing items. Shipping method rules may be used to guide which intermediary is to be selected for a particular connection. For instance, the intermediary having the lowest transit cost may always be selected for the same type of shipping. As another example, the intermediary having the fasted delivery time may always be selected.

The rules 642 may further specify particular rules that are applicable to an overall goal in the fulfillment of the orders. Examples of these rules may include:

Minimize the total shipping cost of the items in the orders. Under this rule, the delivery cost of each transit connection may be set as the shipping cost.

Minimize the sum of delivery time of the entire network. Under this rule, the delivery cost of each transit connection may be set as the shipping time.

Minimize the total number of packages delivered in the entire network. Under this rule, the delivery cost of each transit connection may be set as one.

Minimize the total number of packages received by all addresses associated with orders. Under this rule, the delivery cost of any valid transit connection between a potential provider and a potential intermediary may be set as zero and the delivery cost of any valid transit connection between a potential intermediary and a destination associated with an order may be set as one.

As discussed herein, the processor 602 may use the information 630-642 stored in the memory 610 in generating the rule-based model used to generate and select the fulfillment plan regarding delivery of the items. Generally speaking, the process of handling the rules 642, the process of constructing an order fulfillment network, and generating the rule-based model may not be separable and may thus be operated together. In addition, given an order, the processor 602 may detect and apply active rules to construct the order fulfillment network and generate the rule-based model. It should be noted that the rules 642 may be updated dynamically.

In addition, the processor 602 may detect and handle conflicting rules. For instance, the processor 602 may determine that one type of rule supersedes other types of rules. An example of conflicting rules is that, one of the user rules requires minimization of delivery time, but one of the provider rules considers minimizing cost as the highest priority rule. The two different goals defined by the two rules could conflict with each other. In this example, the processor 602 may prioritize the user rule higher than the provider rule or vice versa to avoid the conflicting rules.

The processor 602 may generate the rule-based model used to identify the fulfillment plan as a linear integer problem, e.g., a distributed order management problem, and may apply a linear programming method to solve the problem. As the number of the components contained in the network grows, the complexity of the rule-based model grows exponentially and leads to a large scale linear integer problem, which is a NP-hard problem (non-deterministic polynomial-time hard). Considering that the distributed order management problem discussed herein may involve a number of unfulfilled orders, providers, and intermediaries, as well as complex rules, the processor 602 may apply a heuristic method to solve this complex problem.

The memory 610 may further have stored thereon a plurality of factors 644 pertaining to the delivery of the items. That is, for instance, the processor 602 may determine the factors 644 during generation of the candidate fulfillment plans and may store the factors 644 corresponding to each of the candidate fulfillment plans. The factors 644 for a candidate fulfillment plan may include, for instance, a total number of orders that have an infeasible fulfillment plan, a total number of orders that are not fulfilled, a total number of orders that violate a delivery constraint, a total number of orders that violate an item constraint, and the like. Orders that have an infeasible fulfillment plan may be defined as orders that may be fulfilled by violating one or more existing constraints. Orders that are not fulfilled may be defined as orders that may not be fulfilled even by relaxing constraints. By way of example, an order for a product may not fulfilled in instances in which the product is not available anywhere. As discussed herein, the factors 644 may be included in an evaluation function applied to the candidate fulfillment plans to determine evaluation values of the candidate fulfillment plans.

Figure 7:
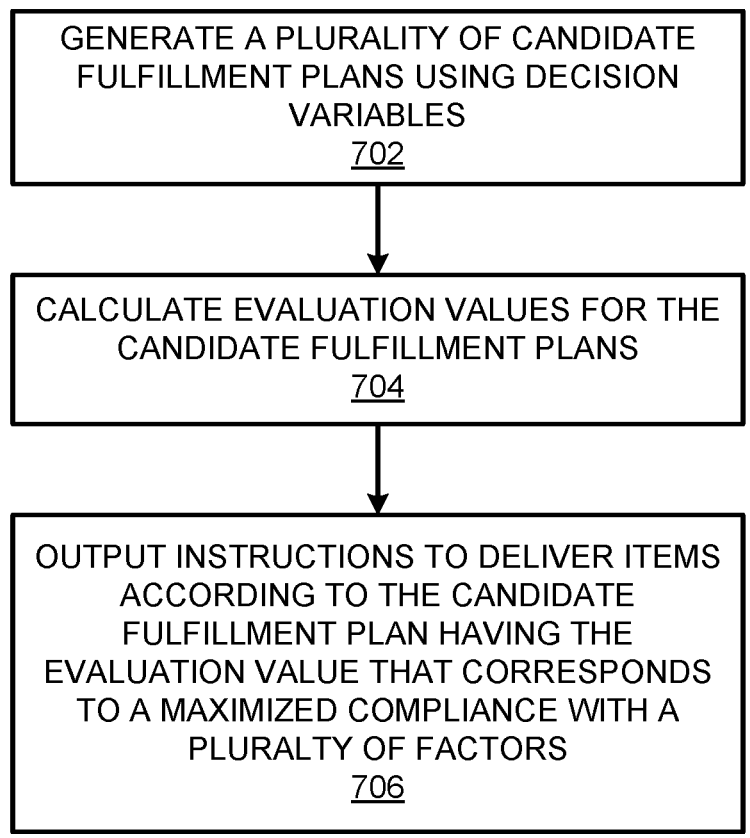
FIG. 7 depicts a flow diagram of a method for identifying a fulfillment plan that corresponds to a maximized compliance with a plurality of factors pertaining to the delivery of items over a network in accordance with an embodiment of the present disclosure.
Figure 8A:
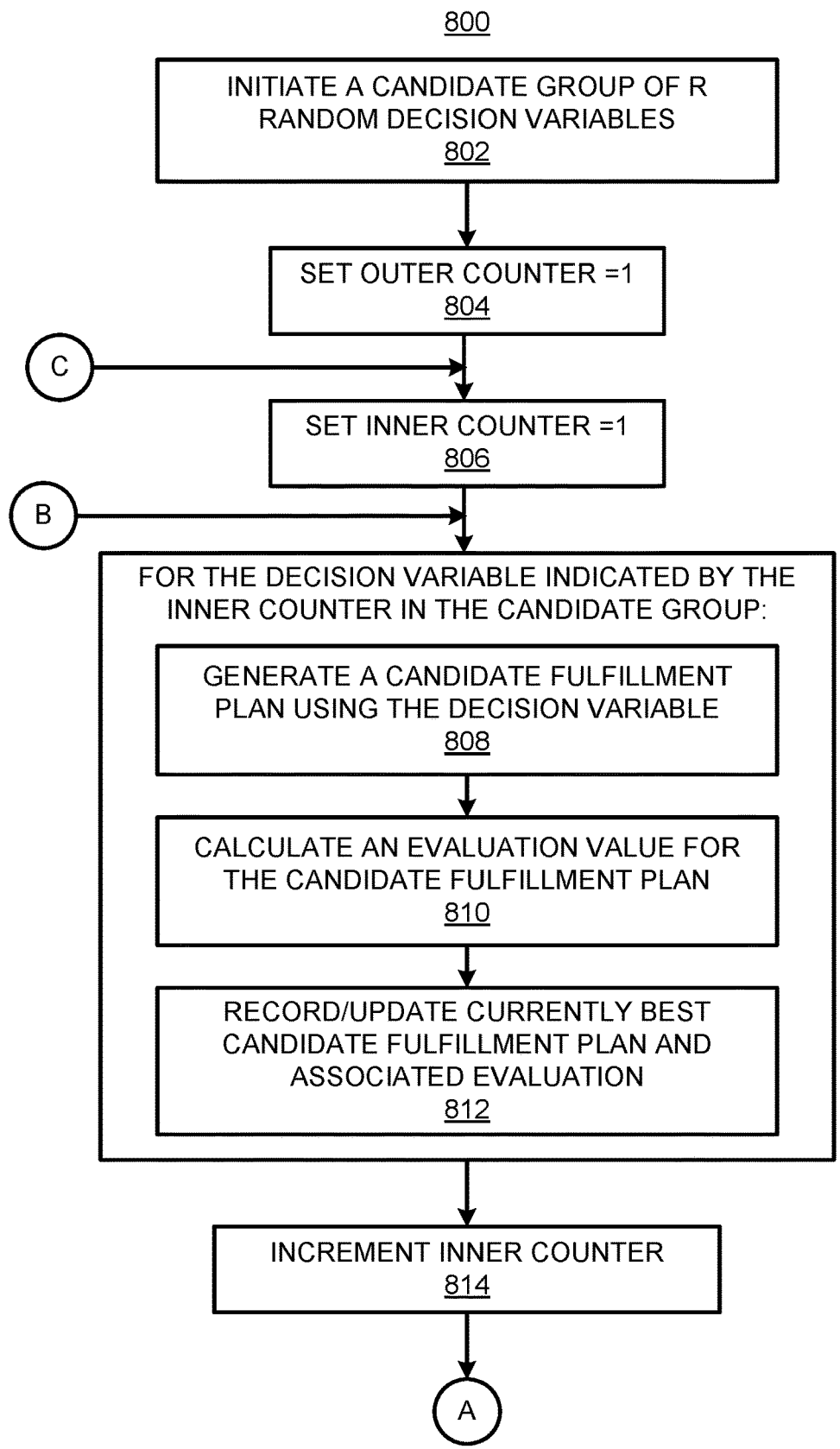
FIGS. 8A and 8B, collectively, depict a flow diagram of a method for identifying a fulfillment plan that corresponds to a maximized compliance with a plurality of factors pertaining to the delivery of items over a network in accordance with another embodiment of the present disclosure.
Figure 8B:
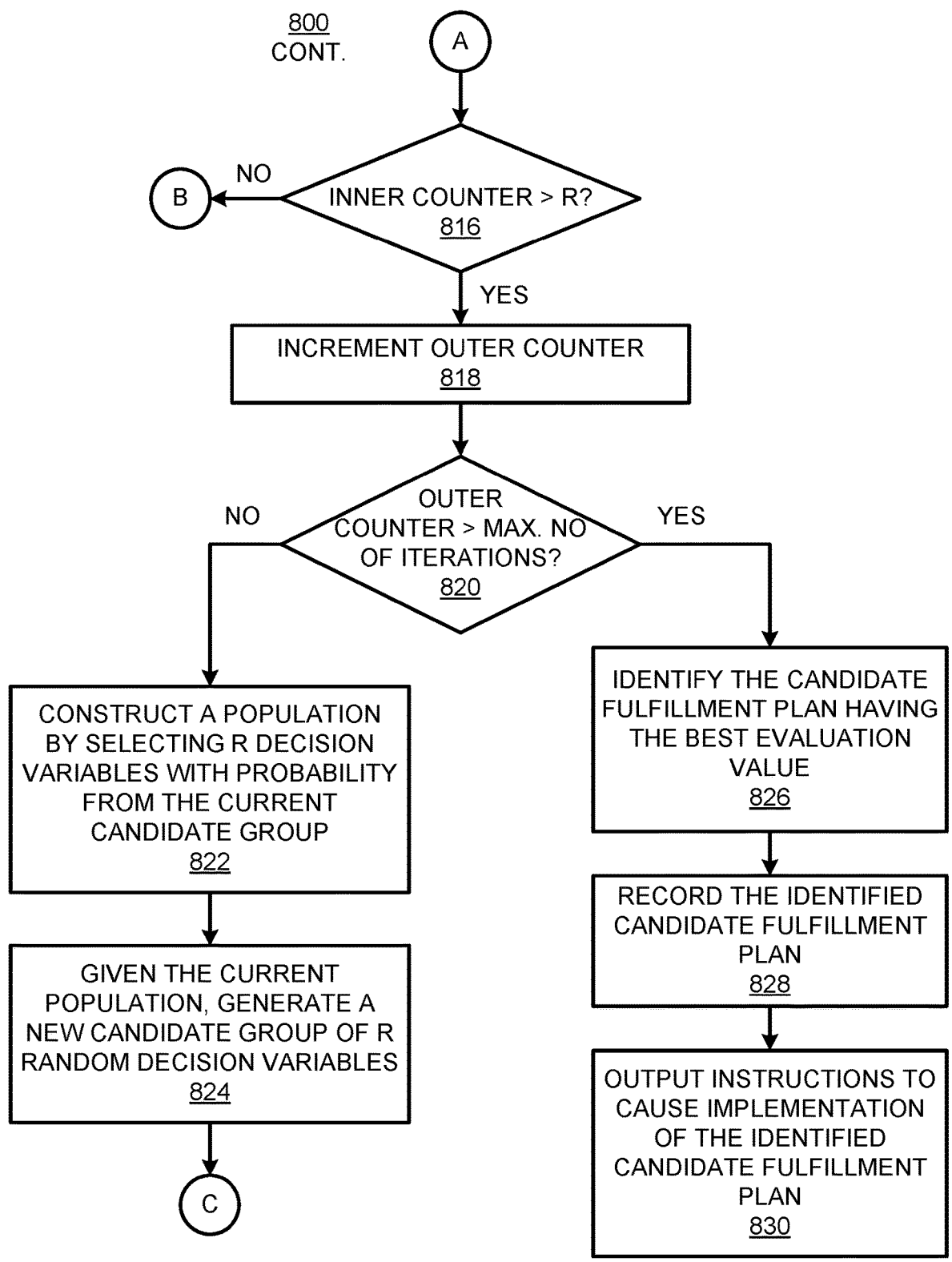
Figure 9:
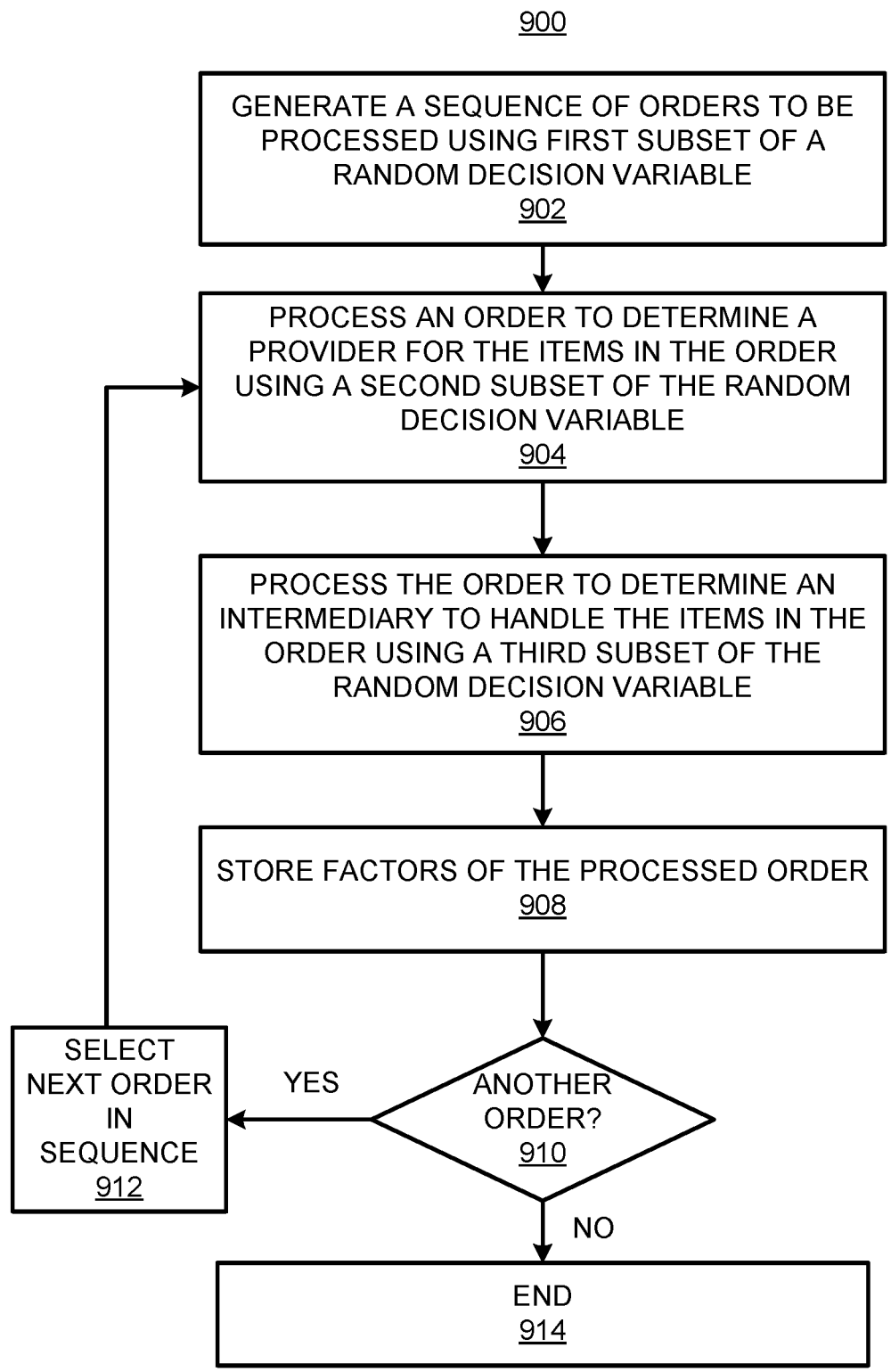
FIG. 9 depicts a flow diagram of a method for generating a candidate fulfillment plan in accordance an embodiment of the present disclosure.

Various manners in which the apparatus 600, and particularly, the processor 602, may operate are discussed in greater detail with respect to the methods 700, 800, and 900 depicted in FIGS. 7-9. Particularly, FIG. 7 depicts a flow diagram of a method 700 for identifying a fulfillment plan that corresponds to a maximized compliance with a plurality of factors 644 pertaining to the delivery of items over a network in accordance with an embodiment of the present disclosure. FIGS. 8A and 8B, collectively, depict a flow diagram of a method 800 for identifying a fulfillment plan that corresponds to a maximized compliance with a plurality of factors 644 pertaining to the delivery of items over a network in accordance with another embodiment of the present disclosure. In other words, FIGS. 7 and 8A-8B, respectively, depict flow diagrams of methods 700 and 800 for identifying a fulfillment plan that corresponds to a maximized compliance with a plurality of factors 644 pertaining to fulfillment of multiple orders for the delivery of items. In addition, FIG. 9 depicts a flow diagram of a method 900 for generating a candidate fulfillment plan in accordance with an embodiment of the present disclosure. It should be understood that the methods 700, 800, and 900 depicted in FIGS. 7-9 may include additional operations and that some of the operations described therein may be removed and/or modified without departing from the scopes of the methods 700, 800, and 900. The descriptions of the methods 700, 800, and 900 are made with reference to the features depicted in FIGS. 5 and 6 for purposes of illustration.

With reference first to FIG. 7, at block 702, the processor 602 may execute the instructions 622 to generate a plurality of candidate fulfillment plans, in which each of the plurality of candidate fulfillment plans is generated using a respective decision variable 630. Thus, the processor 602 may use a plurality of decision variables to generate the candidate fulfillment plans. In addition, each of the plurality of decision variables may include different sets of values with respect to each other. In this regard, application of the respective decision variables may result in the candidate fulfillment plans having different combinations of providers 502 and intermediaries 510 with respect to each other.

A decision variable may not be a naturally defined decision variable, but may be an artificially defined array with values between 0 and 1. The values in the decision variable may be randomly selected. Particularly, for instance, the decision variable may be a random decision variable, which may be represented as $(X_r)$, and may be an array of random numbers or values as indicated in the following equation (1):

$$X_r = \{x_{r1}, x_{r2}, \ldots, x_{r(N_s)}, x_{r(N_s+1)}, x_{r(N_s+2)}, \ldots, x_{r(N_s+N_s)}, x_{r(2N_s+1)}, x_{r(2N_s+2)}, \ldots, x_{r(2N_s+K)}\}$$

In equation (1) above, $x_{ri}$ is a random value generated by an iteration of a chosen heuristic optimization algorithm, $0 < x_{ri} \leq 1$ for all i, $N_s$ is a total number of potential providers 502 and K is total number of orders to be fulfilled. In some examples, the "artificial" decision variable, such as the random decision variable $(X_r)$, may be constructed to map a complex decision variable of an original problem into a well-defined high dimension decision variable with a [0, 1] boundary on each dimension such that the decision variable may fit into a class of well-developed heuristic algorithms, such as the genetic algorithm, the simulated annealing algorithm, and the like.

In addition, $X_r$ in equation (1) above may be construed as including three subsets. A first subset of the decision variable $X_r$ may include the values in the array $\{x_{r(2N_s+1)}, x_{r(2N_s+2)}, \ldots, x_{r(2N_s+K)}\}$, a second subset of the decision variable $X_r$ may include the values in the array $\{x_{r1}, x_{r2}, \ldots, x_{rN_s}\}$, and a third subset of the decision variable $X_r$ may include the values in the array $\{x_{r(N_s+1)}, x_{r(N_s+2)}, \ldots, x_{r(N_s+N_s)}\}$. As discussed in detail herein, for a particular candidate fulfillment plan, the processor 602 may use the values in the first subset of the decision variable $X_r$ to determine sequence in which orders are processed, the values in the second subset of the decision variable $X_r$ to determine which of the providers 502 is to provide the items in the orders, and the values in the third subset of the decision variable $X_r$ to determine which of the intermediaries 510 are to handle the items in the orders.

At block 704, the processor 602 may execute the instructions 624 to calculate evaluation values for the candidate fulfillment plans. The evaluation value (which is equivalently recited herein as a score) for a candidate fulfillment plan may be determined through application of an evaluation function (which is equivalently recited herein as an objective function), on factors 644 of the candidate fulfillment plan. Particularly, for instance, the processor 602 may calculate the evaluation value for a candidate fulfillment plan that was generated using a particular decision variable $X_r$, through application of the following equation (2):

$$f(X_r) = w_1 \cdot \alpha_1(X_r) + w_2 \cdot \alpha_2(X_r) + w_3 \cdot \alpha_3(X_r) + w_4 \cdot \alpha_4(X_r) / n_{orders} + C(X_r)$$

In Equation (2), $\alpha_1(X_r) = $ total number of orders that have infeasible fulfillment plan $\alpha_2(X_r) = $ total number of orders that are not fully fulfilled $\alpha_3(X_r) = \sum_{\substack{orders\ violate \\ delivery\ constrain}} (\text{delivery time} - \text{max allowed delivery time})$ $\alpha_4(X_r) = \sum_{\substack{orders\ violate \\ package\ constrain}} (\text{number of delivery package} - \text{max allowed delivery package})$ $w_1, w_2, w_3, w_4$: infeasible penalties with values $>0$
$n_{orders}$: total number of orders.
$C(X_r)$: total cost (any goal).

Through application of equation (2) on each of the candidate fulfillment plans, a respective evaluation value (or equivalently, score), may be calculated for each of the candidate fulfillment plans. Thus, for instance, a first fulfillment plan for a group of orders to be fulfilled by a first provider 502-1 and a first intermediary 510-1 may have a first evaluation value, a second fulfillment plan for a group of order to be filled by a second provider 502-2 and a second intermediary 510-2 may have a second evaluation value, and so forth.

At block 706, the processor 602 may execute the instructions 228 to output instructions to deliver the items over the network 500 according to the candidate fulfillment plan having the evaluation value that corresponds to a maximized compliance with the plurality of factors among the calculated evaluation values to maximize compliance with the plurality of factors in the delivery of the items. As noted above, the plurality of factors may include the factors included in equation (2). In addition, the processor 602 may output the instructions to the provider or providers 502 identified in the selected candidate fulfillment plan via the interface 604. In response to receipt of the instructions, the provider(s) 502 may initiate delivery of the items through the selected intermediary or intermediaries 510.

By way of example in which the items are data packets, the provider(s) 502 may insert appropriate routing and destination address information into the data packets or packages containing the data packets such that the data packets are delivered through the selected intermediary or intermediaries 510. In other examples in which the items are products, the provider(s) 502 may set up the products to be delivered to the selected intermediary or intermediaries 510. In any of these examples, the items may be delivered to the destination or destinations 620 through the network 500 according to the selected fulfillment plan.

With reference now to FIGS. 8A and 8B, at block 802, the processor 602 may execute the instructions 614 to initiate a candidate group of R random decision variables, in which the processor 602 may generate the R random decision variables. The variable "R" may represent a value greater than one. The processor 602 may implement any suitable random value generation scheme to generate each of the random decision variables to include different sets of random values with respect to each other and to have some distribution such as a uniform distribution. In addition, each of the random decision variables may be an artificially defined array of values between 0 and 1. Particularly, for instance, each random decision variable may be represented as ($X_r$) in equation (1) as discussed above with respect to FIG. 7. Each of the random decision variables ($X_r$) may include subsets of random values, which may be used to determine the candidate fulfillment plans. In addition, the processor 602 may store the generated random decision variables 630 in the memory 610.

At blocks 804 and 806, respectively, the processor 602 may execute the instructions 618 to set an outer counter (first counter) to "1" and to set an inner counter (second counter) to "1".

The processor 602 may execute blocks 808-812 for the random decision variable indicated by the inner counter contained in the candidate group of R random decision variables. Particularly, at block 808, the processor 602 may execute the instructions 622 to generate a candidate fulfillment plan using the random decision variable. Generally speaking, a fulfillment plan may be a plan to assign items to be delivered from a chosen provider or providers 502 to a destination or destinations 520 via a chosen intermediary or intermediaries 510. In addition, the processor 602 may use the subsets of random values in the random decision variable to determine the sequence in which multiple orders in the candidate fulfillment plan are to be processed, to determine the provider or providers 502 that are to provide the items in the orders, and to determine the intermediary or intermediaries 510 that are to handle the items in the orders.

With reference now to method 900 in FIG. 9, which shows an example manner in which the processor 602 may generate the candidate fulfillment plan. At block 902, the processor 602 may generate a sequence of the orders to be processed. Particularly, for instance, the processor 602 may identify from the order data 634 orders that have not yet been fulfilled and may determine the sequence in which the processor 602 is to process the unfilled orders. For instance, the processor 602 may process the unfilled orders one-by-one according to a sequence determined by the subset of the random decision variable selected at block 806, e.g., the subset of $X_r$, $\{x_{r(2N_s+1)}, x_{r(2N_s+2)}, \ldots, x_{r(2N_s+K)}\}$, in which K is the total number of unfilled orders. That is, each of the unfilled orders may be assigned to one of the random values in the subset of $X_r$. Thus, a first unfilled order may be assigned the random value $x_{r(2N_s+1)}$, a second unfilled order may be assigned the random value $x_{r(2N_s+2)}$, a third unfilled order may be assigned the random value $x_{r(2N_s+3)}$.

According to examples, the processor 602 may determine the first order to be processed from the random values assigned to the orders. That is, for instance, the sequence of the orders may be based upon where the random values lie with respect to particular ranges of values. To illustrate this process, the following example is provided in which there are a total of three unfulfilled orders, Order A, Order B, and Order C, to be processed, i.e., K=3, with $\{x_{r(2N_s+1)}, x_{r(2N_s+2)}, x_{r(2N_s+3)}\}=\{0.9, 0.4, 0.1\}$. In this example, the first order to be processed may be determined by the value of $x_{r(2N_s+1)}$. Considering there are three orders to be processed, if the value of $x_{r(2N_s+1)}$ falls in the range $$\left(0, \frac{1}{3}\right], \left(\frac{1}{3}, \frac{2}{3}\right],$$

then Order A will be processed first; if the value of $x_{r(2N_s+1)}$ falls in the range $$\left(\frac{1}{3}, \frac{2}{3}\right],$$

then Order B will be processed first; and if value of $x_{r(2N_s+1)}$ falls in the range $$\left(\frac{2}{3}, 1\right],$$

then Order C will be processed first. In this example, the value of $x_{r(2N_s+1)}=0.9$, which falls in the range $$\left(\frac{2}{3}, 1\right],$$

and therefore Order C is determined to be processed first.

Continuing with the example, the second order to be processed in the sequence may be determined by the value of $x_{r(2N_s+2)}$. Considering there are two orders remaining to be processed (i.e., Order A and Order B), if the value of $x_{r(2N_s+2)}$ falls in the range $$\left(0, \frac{1}{2}\right],$$

then Order A will be processed before Order B and if the value of $x_{r(2N_s+2)}$ falls in the range $$\left(\frac{1}{2}, 1\right],$$

then Order B will be processed before Order A. In this example, the value of $x_{r(2N_s+2)}=0.4$, which falls in the range $$\left(0, \frac{1}{2}\right],$$

and therefore Order A is determined to be processed before Order B. As such, the processing sequence of the orders in this example is Order C, Order A, and Order B.

At block 904, the processor 602 may process a first order in the sequence of orders generated at block 502 to determine a provider or providers 502 for the items in the first order using a second subset of the random decision variable. In other words, the processor 602 may assign valid providers 502 for the order that may be able to supply the items in the order satisfy rules and constraints associated with the order. For instance, the processor 602 may construct a list of valid providers 502 that include providers 502 that are able to meet a delivery time constraint, satisfy other rules, such as shipping restriction rules, etc. By way of particular example, in which n represents the total number of valid providers 502 in the list; if $n_p=0$, the processor 602 may mark the order as having none of the items fulfilled. In this event, the processor 602 may store an indication that the order has not been fulfilled and the processor 602 may process the next order in the sequence of orders.

However, if there is at least one valid provider 502 for the order, the processor 602 may assign the valid providers 502 one-by-one according to a sequence determined by the second subset of the random decision variable $X_r$, $\{x_{r1}, x_{r2}, \ldots, x_{rN_s}\}$, until the order is fully fulfilled or all the valid providers 502 have been processed. The processor 602 may assign the valid providers 502 in the following manner.

Increase $i_p=i_p+1$; if $i_p>N_s$, set $i_p=1$;
Identify a valid provider from the list according to the value of the random value $x_{ri_p}$, e.g., if $$\frac{j-1}{n_p} < x_{ri_p} \leq \frac{j}{n_p},$$

then the $j^{th}$ valid provider 502 in the list is identified.
Assign the $j^{th}$ valid provider to fulfill the order as much as possible; record the assignment and fulfillment, and update the inventory of the $j^{th}$ valid provider;
Decrease $n_p=n_p-1$;
If the order is fully fulfilled, stop the process of assigning valid providers, and mark the order as fully fulfilled; otherwise, if $n_p=0$, stop the process of assigning valid source nodes, and mark the order as partially fulfilled; if none of the above, go back to the first step.

Following block 504, the processor 602 may have identified a valid provider 502, multiple valid providers 502, or no valid providers. In addition, the processor 602 may have stored this information as factors 644 in the memory 610.

At block 906, the processor 602 may determine an intermediary or intermediaries 510 to handle the currently processed order. In other words, the processor 602 may assign an intermediary 510 to each of the valid providers 502 determined at block 504. For instance, the processor 602 may set up a list of valid intermediaries 510 such that the transit from any listed intermediary 510 to the processed order may not be restricted. By way of particular example, in which $n_h$ represents the total number of intermediaries 510 in the list, the processor 602 may assign the valid intermediaries in the following manner.

set
m=min(number of providers assigned to the order, customer specified max number of packages allowed to ship for fulfilling the order)
generate a sequence of intermediaries 510 with m elements from the list of valid intermediaries as follows:
set k=0;
increase $i_h=i_h+1$; if $i_h>N_s$, set $i_h=1$;
identify an intermediary from the list of valid intermediaries according to the value of the random number $x_{r(N_s+i_h)}$, e.g., if $$\frac{j-1}{n_h} < x_{r(N_s+i_h)} \leq \frac{j}{n_h},$$

then the $j^{th}$ intermediary in the valid intermediary list is picked up;
increase k=k+1; if k=m, stop; otherwise, go back to the first step.
for each provider assigned to fulfill the currently processed order, assign an intermediary from the sequence of intermediaries generated above as follows:
check the sequence of intermediaries generated above one-by-one until the first feasible intermediary is found such that: the connection from the processed provider to the intermediary is not restricted; the delivery time from the processed provider to the processed order via the chosen intermediary is feasible; and if a feasible intermediary is not found, set the processed provider itself as its intermediary.
stop if all providers assigned to fulfill the currently processed order are processed.

At block 908, the processor 502 may store various information pertaining to the generation of the candidate fulfillment plan using the random decision variable. The various information (or factors 644) pertaining to the candidate fulfillment plan may include, for instance, a total number of orders that have an infeasible fulfillment plan, a total number of orders that are not fulfilled, a total number of orders that violate a delivery constraint, a total number of orders that violate an item constraint, etc.

At block 910, the processor 602 may determine whether another order is to be processed. That is, the processor 602 may determine whether there is another unfilled order to be processed. In response to a determination that another order is to be processed, the processor 602 may select the next order in the sequence of orders generated at block 902. In addition, the processor 602 may repeat blocks 904-908 on the next order in the sequence. The processor 602 may also repeat blocks 904-912 for any additional orders in the sequence until the processor 602 determines that all of the orders in the sequence have been processed, at which point the method 900 may end as indicated at block 914.

According to embodiments, the processor 602 may implement a feasibility improvement process for the orders in the candidate fulfillment plan. That is, the processor 602 may implement the feasibility improvement process to improve the feasibility of the orders that have infeasible fulfillment plans. An order having an infeasible fulfillment plan may be defined as an order that is not fully fulfilled, an order for which the fulfillment plan of the order violates a delivery constraint or a maximum package constraint, etc. The processor 602 may implement the feasibility improvement process for an order with an infeasible fulfillment plan as follows.

If the order is not fully fulfilled, try to fulfill the order by ignoring the delivery time as follows.
(a) Construct a list of providers for the order such that the delivery time from a valid provider to the order violates delivery constraints but still satisfies shipping restriction rules. If the list is empty, stop, otherwise, go to the next step.
(b) Check the list of providers generated by step (a) one-by-one, if there is any available inventory that may be assigned to fulfill the processed order, assign the provider, and record the assignment and fulfillment, and update the inventory of the assigned provider. In addition, set the assigned provider itself as its intermediary. Stop the process if the order is fully fulfilled or if all of the providers in the list have been processed.
(c) Update the delivery time and total number of packages of the processed order.

If the fulfillment plan of the processed order violates the delivery constraint or the maximum packages constraint, the processor 602 may execute the following feasibility improvement process:
(a) Collect all providers assigned to the processed order as a list;

(b) For each provider identified in the list, find all feasible intermediaries such that: the connection from the processed provider to the intermediary is not restricted and the delivery time from the processed provider to the processed order via the chosen intermediary is feasible;

(c) Find the intermediary that is feasible for most providers contained in the list, if multiple intermediaries exist, choose the first one; then set the chosen intermediary as the connected intermediary to the providers for which the intermediary is feasible; and remove the providers that have been assigned a feasible intermediary from the list of providers;

(d) If the list of providers is empty, or if there is no feasible intermediary for all of the providers contained in the list, stop; otherwise, go to step (c).

Following implementation of the method 900, the processor 602 may have stored factors 644 pertaining to the orders in a candidate fulfillment plan in the memory 610. The factors 644 may include factors that were obtained with or without implementation of the feasibility improvement process.

With reference back to FIG. 8A, following generation of the candidate fulfillment plan using the selected random decision variable at block 808, the processor 602 may execute the instructions 624 to calculate an evaluation value for the generated candidate fulfillment plan. The evaluation value may be defined as a measure of a compliance of the candidate fulfillment plan with a plurality of factors pertaining to the delivery of items. In this regard, the evaluation value may be determined through application of an evaluation function (which is also referenced herein as an optimization function) that includes the plurality of factors. An example of the evaluation function is described above with respect to equation (2).

At block 812, the processor 602 may record the candidate fulfillment plan generated at block 808 and the associated evaluation of the candidate fulfillment plan, for instance, in the memory 610. During a first iteration of blocks 808-812, the processor 602 may simply record the generated fulfillment plan. In further iterations, however, the processor 602 may update the recorded fulfillment plan and the associated evaluation to be the best fulfillment plan, e.g., the fulfillment plan that has the maximized compliance of the fulfillment plans that have been generated during the iterations.

At block 814, the processor 602 may execute the instructions 618 to increment the inner counter by 1. In addition, at block 816, the processor 602 may determine whether the inner counter is greater than R, e.g., whether each of the candidate groups of R random decision variables has been processed. In response to a determination that the inner counter is less than R, the processor 602 may repeat blocks 808-812 for the decision variable indicated by the inner counter, which has been increased by one since the prior iteration of blocks 808-812. In addition, the processor 602 may repeat blocks 808-816 until a determination is made at block 416 that the inner counter is greater than R.

In response to a determination at block 816 that the inner counter is greater than R, at block 818, the processor 602 may execute the instructions 618 to increment the outer counter by 1. In addition, at block 820, the processor 602 may determine whether the outer counter exceeds a certain maximum number of iterations. The certain maximum number of iterations may be user-defined and may be set to prevent the method 800 from repeating without stop and/or to generate and evaluate a certain number of candidate fulfillment plans. In response to a determination at block 820 that the maximum number of iterations has not been reached, the processor 602 may construct a population by selecting R random decision variables with a probability from the current candidate group of R random decision variables as indicated at block 822. The probability may be provided by a chosen heuristic optimization algorithm, e.g., the genetic algorithm, the simulated annealing algorithm, and the like. The same decision variables contained in the candidate group may be selected multiple times.

At block 824, the processor 602 may generate a new candidate group of R random decision variables given the population constructed at block 822. In addition, the processor 602 may repeat blocks 806-824 using the new candidate group of R random decision variables. In this regard, at block 812, the currently best candidate fulfillment plan and the associated evaluation may be updated as additional best candidate fulfillment plans are identified.

With reference back to block 820, in response to a determination that the outer counter exceeds the maximum number of iterations, the processor 602 may execute the instructions 626 to identify the candidate fulfillment plan having the evaluation value that corresponds to a maximized compliance with the plurality of factors identified in the evaluation function. By way of example, the processor 602 may determine that the candidate fulfillment plan having the lowest evaluation value determined through application of the evaluation function defined by equation (2) may have the maximized compliance. In other words, the processor 602 may identify the candidate fulfillment plan as the candidate fulfillment plan that was identified as the best candidate fulfillment plan through multiple iterations of block 812 as discussed above. In any regard, the processor 602 may identify the candidate fulfillment plan at block 826 by passing the best candidate fulfillment plan identified at block 812.

At block 828, the processor 602 may record the candidate fulfillment plan as the plan that is to be implemented to deliver the items in the orders. In addition, at block 830, the processor 602 may execute the instructions 628 to output instructions to cause implementation of the identified fulfillment plan. That is, for instance, the processor 602 may output instructions via the interface 604 to the provider or providers 502 selected in the identified fulfillment plan and the provider or providers 502 may initiate delivery of the items in the orders according to the instructions.

Some or all of the operations set forth in the methods 300 and 700-900 may be included as utilities, programs, or subprograms, in any desired computer accessible medium. In addition, the methods 300 and 700-900 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
a processor; and
a memory on which is stored machine readable instructions that are to cause the processor to:
identify a plurality of tasks;
identify a plurality of resources configured to execute the tasks;
decompose the plurality of tasks into multiple groups of tasks based on a plurality of rules applicable to the multiple groups of tasks; and
for each group in the multiple groups of tasks,
model the group of tasks and a subset of the plurality of resources as a respective resource allocation problem;
assign a respective processing device of a plurality of processing devices to solve the resource allocation problem;
direct the assigned processing device to solve the resource allocation problem;
receive solutions to the resource allocation problems;
determine whether execution of a received solution of the received solutions violates a rule of the plurality of rules;
based on a determination that execution of the received solution violates a rule of the plurality of rules,
reject the received solution;
identify the resource allocation problem corresponding to the rejected solution; and
assign a processing node to solve the identified resource allocation problem while complying with the violated rule as a constraint to the identified resource allocation problem; and
based on a determination that execution of the received solutions does not violate any of the rules in the plurality of rules,
generate a fulfillment plan based on the received solutions; and
output the fulfillment plan.

2. The apparatus of claim 1, wherein a first rule of the plurality of rules applies to a first group of tasks and a second rule of the plurality of rules applies to a second group of tasks.

3. The apparatus of claim 1, wherein the instructions are further to cause the processor to:
record the fulfillment plan in a log.

4. The apparatus of claim 1, wherein, for each of the groups of tasks, the instructions are further to cause the processor to model the group of tasks and the subset of the plurality of resources as a respective constraint-based resource allocation problem to meet a predefined goal.

5. The apparatus of claim 1, wherein the plurality of rules includes a first rule applicable to a first group of tasks and a second rule applicable to a second group of tasks, and wherein to decompose the plurality of tasks, the instructions are further to cause the processor to:

decompose the plurality of tasks into the first group of tasks for execution of the first group of tasks while complying with the first rule; and
decompose the plurality of tasks into the second group of tasks for execution of the second group of tasks while complying with the second rule.

6. The apparatus of claim 1, wherein the instructions are further to cause the processor to:
determine a number of inter-related tasks in the plurality of tasks; and
model the groups of tasks as respective resource allocation problems that include a constraint pertaining to a relationship between the inter-related tasks.

7. The apparatus of claim 1, wherein the plurality of tasks comprise fulfillment of a plurality of orders for delivery of items or placement of computing jobs on cloud resources.

8. The apparatus of claim 1, wherein the instructions are further to cause the processor to generate an execution plan that defines an order in which the tasks are to be completed and sources from which items corresponding to the tasks are to be delivered.

9. A method comprising:
identifying, by a processor, a first rule applicable to a first set of tasks in a pool of tasks;
identifying, by the processor, a second rule applicable to a second set of tasks in the pool of tasks;
creating, by the processor, a first resource allocation problem for the first set of tasks;
creating, by the processor, a second resource allocation problem for the second set of tasks;
directing, by the processor, a first processing device to solve the first resource allocation problem;
directing, by the processor, a second processing device to solve the second resource allocation problem;
generating, by the processor, a task fulfillment plan using solutions to the first resource allocation problem and the second resource allocation problem;
receiving, by the processor, solutions to the first resource allocation problem and the second resource allocation problem;
determining, by the processor, whether execution of a received solution of the received solutions violates a rule of a plurality of rules;
based on a determination that execution of the received solution violates a rule of the plurality of rules, by the processor,
rejecting the received solution;
identifying the resource allocation problem corresponding to the rejected solution; and
assigning a processing device to solve the identified resource allocation problem with the violated rule as a constraint to the identified resource allocation problem; and
based on a determination that execution of the received solutions does not violate any of the rules in the plurality of rules, by the processor,
generating the fulfillment plan based on the received solutions; and
outputting the fulfillment plan.

10. The method of claim 9, further comprising:
determining the first resource allocation problem for the first set of tasks as a first constraint-based resource allocation problem to meet a predefined goal; and
determining the second resource allocation problem for the second set of tasks as a second constraint-based resource allocation optimization problem to meet the predefined goal.

11. The method of claim 9, further comprising:
determining a number of inter-related tasks in the first set of tasks; and
wherein determining the first resource allocation problem further comprises determining the first resource allocation problem to include a constraint pertaining to a relationship between the inter-related tasks.

12. The method of claim 9, wherein the pool of tasks comprises a plurality of computing jobs to be placed on a plurality of cloud resources.

13. A non-transitory computer readable medium on which is stored machine readable instructions that when executed by a processor cause the processor to:
identify a pool of tasks;
identify a first rule applicable to a first task in the pool of tasks;
identify a second rule applicable to a second task in the pool of tasks;
generate an execution plan for implementation of the tasks;
determine a first resource allocation problem for implementation of the first task according to the execution plan while complying with the first rule;
determine a second resource allocation problem for implementation of the second task according to the execution plan while complying with the second rule;
direct a first processing device to solve the first resource allocation problem;
direct a second processing device to solve the second resource allocation problem;
generate a fulfillment plan for the tasks based on solutions to the first resource allocation problem and the second resource allocation problem;
receive solutions to the first resource allocation problem and the second resource allocation problem;
determine whether execution of a received solution of the received solutions violates a rule of a plurality of rules;
based on a determination that execution of the received solution violates a rule of the plurality of rules,
reject the received solution;
identify the resource allocation problem corresponding to the rejected solution; and
direct a processing device to solve the identified resource allocation problem with the violated rule as a constraint to the identified resource allocation problem; and
based on a determination that execution of the received solutions does not violate any of the rules in the plurality of rules,
generate the fulfillment plan based on the received solutions; and
output the fulfillment plan.

14. The non-transitory computer readable medium of claim 13, wherein the instructions are further to cause the processor to:
determine a number of inter-related tasks in the first set of tasks; and
determine the first resource allocation problem to include a constraint pertaining to a relationship between the inter-related tasks.

* * * * *